United States Patent
Rasanen et al.

(10) Patent No.: US 10,462,626 B2
(45) Date of Patent: *Oct. 29, 2019

(54) CONTROL OF COMMUNICATION USING SERVICE FUNCTION CHAINING

(71) Applicant: NOKIA SOLUTIONS AND NETWORKS OY, Espoo (FI)

(72) Inventors: John Juha Antero Rasanen, Espoo (FI); Mikko Jyrki Olavi Kanerva, Helsinki (FI)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 52 days.

This patent is subject to a terminal disclaimer.

(21) Appl. No.: 15/513,362

(22) PCT Filed: Sep. 23, 2014

(86) PCT No.: PCT/EP2014/070260
§ 371 (c)(1),
(2) Date: Mar. 22, 2017

(87) PCT Pub. No.: WO2016/045708
PCT Pub. Date: Mar. 31, 2016

(65) Prior Publication Data
US 2017/0250903 A1    Aug. 31, 2017

(51) Int. Cl.
*H04L 12/725* (2013.01)
*H04L 12/24* (2006.01)
(Continued)

(52) U.S. Cl.
CPC .............. *H04W 4/50* (2018.02); *H04L 41/50* (2013.01); *H04L 45/02* (2013.01); *H04L 45/306* (2013.01); *H04L 47/20* (2013.01)

(58) Field of Classification Search
CPC ....... H04L 45/306; H04L 41/50; H04L 45/02; H04L 47/20
See application file for complete search history.

(56) References Cited

U.S. PATENT DOCUMENTS

| 9,998,909 B2 * | 6/2018 | Olsson .................. H04W 8/08 |
| 2014/0269724 A1 | 9/2014 | Mehler et al. |
| 2017/0250902 A1 * | 8/2017 | Rasanen ............... H04L 45/306 |

OTHER PUBLICATIONS

Halpern, Sevice Function Chaining Architecture, Sep. 20, 2014.*
(Continued)

*Primary Examiner* — Ronald B Abelson
(74) *Attorney, Agent, or Firm* — Squire Patton Boggs (US) LLP

(57) ABSTRACT

An apparatus including at least one processing circuitry, and at least one memory for storing instructions to be executed by the processing circuitry, wherein the at least one memory and the instructions are configured to, with the at least one processing circuitry, cause the apparatus at least: to acquire generic service policy rules to be applied to a communication of a service data flow in a communication network, wherein the generic service policy rules are to be used for routing a service data flow to and within at least one external service function or at least one external service function chain; and to provide, to an external service function providing side, the acquired generic service policy rules as information related to an intended usage of at least one external service function or at least one external service function chain in a service data flow communicated in a communication network.

26 Claims, 10 Drawing Sheets

(51) Int. Cl.
*H04L 12/751* (2013.01)
*H04L 12/813* (2013.01)
*H04W 4/50* (2018.01)

(56) References Cited

OTHER PUBLICATIONS

International Search Report & Written Opinion dated May 26, 2015 corresponding to International Patent Application No. PCT/EP2014/070260.

P. Quinn et al.: "Network Service Header; draft-quinn-nsh-01.txt," Network Working Group, IETF, Jul. 12, 2013, 21 pages.

P. Quinn et al.: "Service Function Chaining Problem Statement draft-quinn-sfc-problem-statement-02.txt," Network Norking Group, IETF, Dec. 9, 2013, 18 pages.

3GPP Minutes of 3GPP TSG SA WG1 Meeting #66; S1-143005; 3GPP TSG-SA WG1 Meeting #66, Sapporo, Japan, May 12-16, 2014, 91 pages.

Intel, "AESE TR Scope," 3GPP, SA WG2 Temporary Document, S2-142076, SA WG2 Meeting #103, Phoenix, Arizona, May 19-23, 2014.

Intel et al., "Key issue—Service Capability Exposure Framework," 3GPP SA WG2 Temporary Document, S2-142222, SA WG2 Meeting #103, Phoenix, Arizona, May 19-23, 2014.

Nokia Networks, "Proposed FMSS requirement on SDF identification," 3GPP DRAFT; S1-143187, 3GPP TSG-SA WG1 Meeting #67, Sophia Antipolis, France, Aug. 8, 2014, XP050834677.

SA WG3, "New WID: Architecture Enhancements for Service Capability Exposure (AESE)," 3GPP; TD SP-140301, 3GPP TSG SA Meeting #64, Sophia Antipolis, France, Jun. 16-18, 2014.

3GPP S1-141604_3GPP TR22808 Flexible Mobile Service Steering (FMSS); 2014, DRAFT.

Huawei, "Proposed Service Capability Exposure Framework Model," 3GPP, SA WG2 Temporary Document; S2-142224, SA WG2 Meeting #103, Phoenix, Arizona, May 19-23, 2014.

Alcatel-Lucent, "AESE Architecture," 3GPP; SA WG2 Temporary Document; S2-142082, SA WG2 Meeting #102, Phoenix, Arizona, May 19-23, 2014.

3GPP TR 22.808 V2.0.0 (Sep. 2014), Technical Report, "3rd Generation Partnership Project; Technical Specification Group Services and System Aspects; Study on Flexible Mobile Service Steering (FMSS) (Release 13)," 3GPP Standard; Sep. 22, 2014, pp. 1-19, XP050925548.

* cited by examiner

CONTROL OF COMMUNICATION USING SERVICE FUNCTION CHAINING

BACKGROUND

Field

The present invention relates to apparatuses, methods, systems, computer programs, computer program products and computer-readable media usable for controlling a communication using service function chaining.

Background Art

The following description of background art may include insights, discoveries, understandings or disclosures, or associations, together with disclosures not known to the relevant prior art, to at least some examples of embodiments of the present invention but provided by the invention. Some of such contributions of the invention may be specifically pointed out below, whereas other of such contributions of the invention will be apparent from the related context.

The following meanings for the abbreviations used in this specification apply:

3GPP 3$^{rd}$ Generation Partnership Project
ACK: acknowledgement
BS: base station
CN: core network
CPU: central processing unit
ADC: application detection and control
AESE: architecture enhancements for service capability
API: application programming interface
D2D: device to device
DL: downlink
eNB: evolved node B
EPC: extended packet core
ETSI: European Telecommunications Standards Institute
FMSS: flexible mobile service steering
GGSN: gateway GPRS support node
GPRS: general packet radio service
GW: gateway
HSS: home subscriber server
ID: identification, identifier
IP: Internet protocol
LTE: Long Term Evolution
LTE-A: LTE Advanced
MMS: multimedia messaging service
NSH: network service header
OMA: open mobile alliance
OSI: open system interconnection
PCEF: policy and charging enforcement function
PCRF: policy and charging rules function
P-GW: packet data network gateway
QoS: quality of service
SCF: service capability function
SDF: service data flow
SF: service (chain) function
SFC: service function controller
SMS: short message service
SPR: subscription profile repository
TDF: traffic detection function
UDR: user data repository
UE: user equipment
UL: uplink
VNF: virtual network function Embodiments of the present invention are related to a communication system in which a suitable architecture, procedure and protocol are provided related to a functionality allowing usage of external service functions or service functions chains for achieving a flexible mobile service steering.

SUMMARY

According to an example of an embodiment, there is provided, for example, an apparatus including at least one processing circuitry, and at least one memory for storing instructions to be executed by the processing circuitry, wherein the at least one memory and the instructions are configured to, with the at least one processing circuitry, cause the apparatus at least: to acquire service policy rules to be applied to a communication of a service data flow in a communication network, wherein the service policy rules are to be used for routing a service data flow to and within at least one external service function and/or at least one external service function chain; and to provide, to an external service function providing side, the acquired service policy rules as information related to an intended usage of at least one external service function and/or at least one external service function chain in a service data flow communicated in a communication network.

Furthermore, according to an example of an embodiment, there is provided, for example, a method including acquiring service policy rules to be applied to a communication of a service data flow in a communication network, wherein the service policy rules are to be used for routing a service data flow to and within at least one external service function and/or at least one external service function chain; and providing, to an external service function providing side, the acquired service policy rules as information related to an intended usage of at least one external service function and/or at least one external service function chain in a service data flow communicated in a communication network.

According to further refinements, these examples may include one or more of the following features:

as the service policy rules, generic service policy rules may be acquired by one of creating the generic service policy rules, referring to set configuration information including information related to the generic service policy rules, or processing information obtained from a third entity, wherein the generic service policy rules may include at least one of an identification information for the service data flow, an identification information for at least one service function and/or at least one service function chain via which the service data flow is to be routed, and rules for a usage of the at least one service function and/or at least one service function chain via which the service data flow is to be routed;

the generic service policy rules may include at least one of a static generic service policy rule part and a dynamically changeable generic service policy rule part, wherein the dynamically changeable generic service policy rule part may be changeable with regard to an occurrence of a specific event;

routing rules to be applied to the communication of a service data flow in the communication network may be acquired, wherein the routing rules may be used for identifying a service data flow to be routed to at least one external service function and/or at least one external service function chain; and the acquired routing rules may be provided to a communication network control element;

the routing rules may be acquired by one of creating the routing rules, referring to set configuration information including information related to the routing rules, or processing information obtained from a third entity;

an event triggering activation of specific service policy rules being specific to a communication element or user of the communication network or service data flow may be detected, and, as at least a part of the service policy rules, specific service policy rules being specific to the attached communication element or user or service data flow may be acquired, whose activation is triggered, wherein the specific service policy rules may be used for routing a service data flow to and within at least one external service function and/or at least one external service function chain, and the specific service policy rules may be provided to an external service function providing side;

the event triggering the activation of the specific service policy rules may include at least one of an attachment of a communication element or user to the communication network, an initiation of an application requiring a service data flow, an activation of a service, an update of a subscription of a communication element or user, a specified time point, an elapse of a specified period of time, a traffic load situation, a change of a location of the communication element or user, and acquiring of the specific service policy rules may include at least one of generating the specific service policy rules and obtaining pre-stored information indicating the specific service policy rules;

additional routing rules to be applied to the communication of the service data flow in the communication network may be created, wherein the additional routing rules may be used for identifying a relevant service data flow to be routed to at least one external service function and/or at least one external service function chain; and the additional routing rules may be provided to a communication network control element;

at least one of generic service policy rules, specific service policy rules and routing rules may be updated in response to an indication from at least one of the external service function providing side and the communication network;

data indicating at least one available external service function or at least one available external service function chain via a predetermined interface may be acquired, it may be decided whether at least one of the indicated at least one external service function and/or at least one external service function chain is usable in a communication of a service data flow in the communication network, and at least one from the indicated at least one external service function and/or at least one external service function chain for use may be selected on the basis of the decision whether at least one of the indicated at least one external service function and/or at least one external service function chain is usable in a communication of a service data flow, wherein the information related to an intended usage of at least one external service function and/or at least one external service function chain in a service data flow communicated in a communication network may be based on the selection;

it may be considered whether at least one own service function of the communication network is usable instead of an indicated external service function or external service function chain, or whether the indicated at least one external service function or at least one external service function chain is applicable as a complement to at least one own service function of the communication network, wherein the decision whether at least one of the indicated at least one external service function or at least one external service function chain is usable in a communication of a service data flow may be based on the consideration;

the data indicating the at least one available external service function and/or at least one available external service function chain via the predetermined interface may include at least one of an indication of a respective external service function or external service function chain, an indication of capabilities of a respective external service function or external service function chain, and a tag or an identification element of a respective external service function or external service function chain;

the above described processing may be implemented in a communication network control element configured to act as at least one of a service selection control function and policy and charging rules function, which is connectable to an external service providing side by means of an application programming interface.

In addition, according to a further example of an embodiment, there is provided, for example an apparatus including at least one processing circuitry, and at least one memory for storing instructions to be executed by the processing circuitry, wherein the at least one memory and the instructions are configured to, with the at least one processing circuitry, cause the apparatus at least: to obtain information related to an intended usage of at least one external service function and/or at least one external service function chain in a service data flow communicated in a communication network, wherein the information includes service policy rules to be used for routing a service data flow to and within at least one external service function and/or at least one external service function chain; and to apply the service policy rules to routing a service data flow to and within at least one external service function and/or at least one external service function chain.

Furthermore, according to an example of an embodiment, there is provided, for example, a method including obtaining information related to an intended usage of at least one external service function and/or at least one external service function chain in a service data flow communicated in a communication network, wherein the information includes service policy rules to be used for routing a service data flow to and within at least one external service function and/or at least one external service function chain; and applying the service policy rules to routing a service data flow to and within at least one external service function and/or at least one external service function chain.

According to further refinements, these examples may include one or more of the following features:

the policy rules may include generic service policy rules including at least one of an identification information for the service data flow, an identification information for at least one service function and/or at least one service function chain via which the service data flow is to be routed, and rules for a usage of the at least one service function and/or the at least one service function chain via which the service data flow is to be routed;

as at least a part of the service policy rules, specific service policy rules being specific for a communication element or user attached to the communication network or a service data flow may be received and processed, wherein the specific service policy rules may be used for routing the service data flow to and within at least one external service function and/or at least one external service function chain, and the specific service policy rules may be applied to routing a service data flow to and within at least one external service function and/or at least one external service function chain;

it may be determined whether and which one of the generic policy rules and/or specific policy rules to be used for routing the service data flow can be applied or whether requested service functions or service function chains are available, and, in case the determination of whether the generic policy rules and/or specific policy rules to be used for routing the service data flow can be applied results in an incompatibility of the generic policy rules and specific policy rules, or of whether requested service functions or service function chains are available results in an non-availability of requested service functions or service function chains, it may be requested for an update of generic service policy rules and/or specific service policy rules or a change of the requested service functions or service function chains;

data indicating at least one available external service function and/or at least one available external service function chain via a predetermined interface may be provided, wherein the information related to the intended usage, by the communication network, may indicate at least one external service function and/or at least one external service function chain selected from the at least one indicated external service function or at least one indicated external service function chain in a service data flow communicated in a communication network;

the data indicating the at least one available external service function and/or at least one available external service function chain via the predetermined interface may include at least one of an indication of a respective external service function or external service function chain, an indication of capabilities of a respective external service function or external service function chain, and a tag or an identification element of a respective external service function or external service function chain;

at least one uplink and downlink data packet from the communication network may be received, at least one of the generic service policy rules and the specific service policy rules may be applied to routing the uplink or downlink data packet according to the corresponding rules for the service data flow of the data packet via at least one service function and/or at least one service function chain, and routing of later uplink or downlink data packets of the same service data flow like the received uplink or downlink data packet via the at least one service function and/or at least one service function chain may be prepared;

the uplink or downlink data packet may be forwarded to a destination in the uplink direction or in the communication network;

the above described processing may be implemented in a control element of an external service function providing side, which is connectable to the communication network.

In addition, according to a further example of an embodiment, there is provided, for example an apparatus including at least one processing circuitry, and at least one memory for storing instructions to be executed by the processing circuitry, wherein the at least one memory and the instructions are configured to, with the at least one processing circuitry, cause the apparatus at least: to receive a data packet in at least one of uplink and downlink direction; to check whether for the received data packet any routing rules or configuration settings to be used for routing a service data flow of the data packet to at least one external service function and/or at least one external service function chain are present; and in case the check results in that there are routing rules or configuration settings to be used for routing the service data flow to at least one external service function and/or at least one external service function chain, to forward the received data packet to the at least one external service function and/or at least one external service function chain.

Furthermore, according to an example of an embodiment, there is provided, for example, a method including receiving a data packet in at least one of uplink and downlink direction; checking whether for the received data packet any routing rules or configuration settings to be used for routing a service data flow of the data packet to at least one external service function and/or at least one external service function chain are present; and in case the check results in that there are routing rules or configuration settings to be used for routing the service data flow to at least one external service function and/or at least one external service function chain, forwarding the received data packet to the at least one external service function and/or at least one external service function chain.

According to further refinements, these examples may include one or more of the following features:

the routing rules may be used for identifying a service data flow to be routed to at least one external service function and/or at least one external service function chain;

the routing rules may be acquired from a communication network control element configured to act as at least one of a service selection control function and policy and charging rules function;

routing of later data packets of the same service data flow like the received data packet via the relevant external service function or external service function chain may be prepared;

the above described processing may be implemented in a communication network control element configured to act as at least one of a packet data gateway, traffic detection function and classifier element, which is connectable to an external service providing side by means of an interface.

In addition, according to embodiments, there is provided, for example, a computer program product for a computer, including software code portions for performing the steps of the above defined methods, when said product is run on the computer. The computer program product may include a computer-readable medium on which said software code portions are stored. Furthermore, the computer program product may be directly loadable into the internal memory of the computer and/or transmittable via a network by means of at least one of upload, download and push procedures.

BRIEF DESCRIPTION OF THE DRAWINGS

Some embodiments of the present invention are described below, by way of example only, with reference to the accompanying drawings, in which.

DESCRIPTION OF EMBODIMENTS

Figure 1:
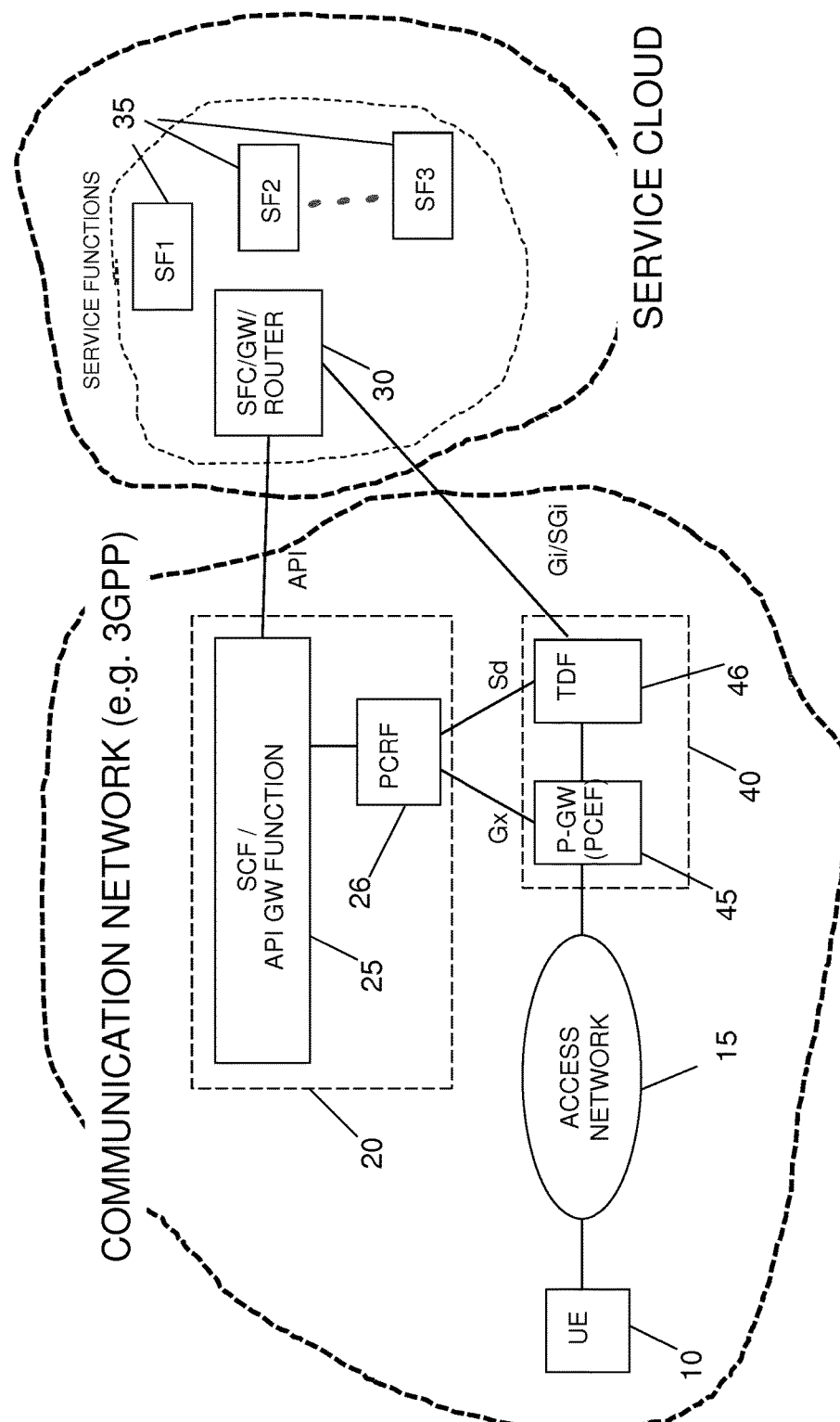
FIG. 1 shows a diagram illustrating a general architecture of a communication system where some examples of embodiments are implementable.

In the last years, an increasing extension of communication networks, e.g. of wire based communication networks, such as the Integrated Services Digital Network (ISDN), DSL, or wireless communication networks, such as the cdma2000 (code division multiple access) system, cellular 3rd generation (3G) like the Universal Mobile Telecommunications System (UMTS), and fourth generation (4G) communication networks or enhanced communication networks based e.g. on LTE or LTE-A, cellular 2nd generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards or specifications for telecommunication network and access environments.

Embodiments as well as principles described below are applicable to any network element, relay node, server, node, corresponding component, and/or to any communication system or any combination of different communication systems that support required functionalities. The communication system may be a fixed communication system, a wireless communication system or a communication system utilizing both fixed networks and wireless networks. The protocols used, the specifications of communication systems, apparatuses, such as nodes, servers and user terminals, especially in wireless communication, develop rapidly. Such development may require extra changes to an embodiment. Therefore, all words and expressions should be interpreted broadly and they are intended to illustrate, not to restrict, embodiments.

In the following, different exemplifying embodiments will be described using, as an example of an access architecture to which the embodiments may be applied, a radio access architecture based on 3GPP standards, such as a third generation or fourth generation (like LTE or LTE-A) communication network, without restricting the embodiments to such an architecture, however. It is obvious for a person skilled in the art that the embodiments may also be applied to other kinds of communications networks having suitable means by adjusting parameters and procedures appropriately, e.g. WLAN or WiFi, worldwide interoperability for microwave access (WiMAX), Bluetooth®, personal communications services (PCS), ZigBee®, wideband code division multiple access (WCDMA), systems using ultra-wideband (UWB) technology, sensor networks, and mobile ad-hoc networks (MANETs).

The following examples and embodiments are to be understood only as illustrative examples. Although the specification may refer to "an", "one", or "some" example(s) or embodiment(s) in several locations, this does not necessarily mean that each such reference is related to the same example(s) or embodiment(s), or that the feature only applies to a single example or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules etc. that have not been specifically mentioned.

A basic system architecture of a communication system where examples of embodiments are applicable may include an architecture of one or more communication networks including a wired or wireless access network subsystem and a core network. Such an architecture may include one or more communication network control elements, access network elements, radio access network elements, access service network gateways or base transceiver stations, such as a base station (BS), an access point or an eNB, which control a respective coverage area or cell(s) and with which one or more communication elements, user devices or terminal devices, such as a UE, or another device having a similar function, such as a modem chipset, a chip, a module etc., which can also be part of an element, function or application capable of conducting a communication, such as a UE, an element or function usable in a machine to machine or D2D communication architecture, or attached as a separate element to such an element, function or application capable of conducting a communication, or the like, are capable to communicate via one or more channels for transmitting several types of data. Furthermore, core network elements such as gateway network elements, policy and charging control network elements, mobility management entities, operation and maintenance elements, and the like may be included.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from an element, function or application, like a communication element, such as a UE, a communication network control element, such as an eNB, and a communication network besides those described in detail herein below.

A communication network may also be able to communicate with other networks, such as a public switched telephone network or the Internet. The communication network may also be able to support the usage of cloud services. It should be appreciated that network elements of an access system, of a core network etc., and/or respective functionalities may be implemented by using any node, host, server or access node etc. entity suitable for such a usage.

Furthermore, the described network elements, such as communication elements, like a UE, communication network control elements, access network elements etc., like an eNB, core network elements, like an MME etc., as well as corresponding functions as described herein, and other elements, functions or applications may be implemented by software, e.g. by a computer program product for a computer, and/or by hardware. For executing their respective functions, correspondingly used devices, nodes or network elements may include several means, modules, units, components, etc. (not shown) which are required for control, processing and/or communication/signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means including e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

It should be appreciated that according to some examples, a so-called "liquid" or flexible network concept may be employed where the operations and functionalities of a communication network element, network function, or of another entity of the communication network, such as of one or more of radio access network elements like an eNB, may be performed in different entities or functions, such as in a node, host or server, in a flexible manner. In other words, a "division of labor" between involved network elements, functions or entities may vary case by case.

An important aspect in the control of communication networks is related to service function and service function chaining. In this context, one target is to achieve a so-called flexible mobile service steering (FMSS).

The delivery of end-to-end services often require various service functions (SF) including e.g. traditional network service functions as well as application-specific features.

A service function concerns, for example, a function that is responsible for specific treatment of (received) packets. For example, a service function may act at a network layer or other OSI layers, can be a virtual instance or be embedded in a physical network element, wherein one of multiple service functions may be embedded in the same network element. It is also possible that multiple instances of a service function are enabled in the same administrative domain. Examples of service functions concern, for example, firewalls, network and application acceleration, deep packet inspection, server load balancers, optimizers, etc.

Service function chaining is used to describe an ordered set of such service functions, and the subsequent "steering" of traffic flows, such as SDF, through those service functions. That is, a service function chain defines an ordered set of service functions that has to be applied to packets and/or frames selected as a result of classification.

Service function chaining in communication networks, such as 3GPP based networks, is assumed to be standardized and/or implemented at certain interfaces of the network, such as a so-called Gi/SGi reference point, so that a communication network control element of the core network of the communication network, such as a P-GW, a GGSN etc., can be involved in the processing. For example, the P-GW or GGSN is configured to provide some services and to modify data packets or an SDF in a manner like an external service function in a service chain. According to further examples, it is also possible that external functions could be replaced by services of the P-GW or GGSN. For example, the communication network control element of the core network of the communication network, such as the P-GW, may include a packet classifier function (or functions) allowing to classify IP packets for routing within the service function chain. It is also assumed that service functions of the chain beyond the Gi/SGi reference point are not in accordance with specifications of the communication network, i.e. may be part of a foreign external network.

Communication networks, such as a 3GPP based system, have unique core assets, denoted as service capabilities, such as communications, context, subscription and control, that may be valuable to application providers. Communications refers to functions like voice calling, SMS, MMS, web browsing, streaming, etc. Subscription includes, for example, subscription identity, feature sets, preference. Context covers real-time user information such as location, presence, profile, device capabilities and data connection type. Control addresses functions like Quality of Service, policy and security.

Network operators may offer value added services by exposing these service capabilities to external application providers, businesses and partners using a suitable interface, such as a web based API. In addition, network operators may combine other internal or external services with their network capabilities to provide richer, composite API services to their partners. Thus, mobile network intelligence can be brought to applications.

Service capability exposure includes the identification and definition of service capabilities on the one hand and the exposure of the capabilities on the other hand. By means of service capability exposure, it is possible to provide authorized and secure access to service capabilities of the communication network and execution of services.

In order to expose service capabilities, for example, a concept referred to as AESE may be used by means of which communication network provided service capabilities are exposed to application providers, e.g. via OMA-API(s), allowing the API and the communication network, such as a 3GPP system, to act together to expose communication network service capabilities.

With regard to FIG. 1, a diagram illustrating a general architecture of a communication system is shown where some examples of embodiments are implementable. It is to be noted that the structure indicated in FIG. 1 shows only those devices, network elements and links which are useful for understanding principles underlying the examples of embodiments of the invention. As also known by those skilled in the art there may be several other network elements or devices involved in a communication in the communication system which are omitted here for the sake of simplicity.

In FIG. 1, two networks are shown which form the general basis of the example of a communication system according to some examples of embodiments. Specifically, as a first network, a (wireless) communication network based for example on a 3GPP specification is provided, while as a second network an external service providing network or system, such as a service cloud, is provided. It is to be noted that both the number of networks as well as the type thereof as depicted in FIG. 1 are merely intended to provide a basis for illustrating the principles of the control processing according to some examples of embodiments, while each one of the number and type of the involved network may be different to those shown in FIG. 1.

According to FIG. 1, reference sign 10 denotes a communication element, such as a UE, of a subscriber which represents one terminal point of a communication, i.e. from which UL data packets are transmitted and to which DL data packets are sent. Reference sign 15 denotes an access network via which the UE 10 is connecting to the communication network. The access network comprises, for example, base stations, access nodes or the like.

Reference sign 40 denotes a communication network control element of a core network of the communication network, which comprises a gateway function acting as a gateway to an external side, such as a P-GW 45, and a traffic detection function (TDF) 46. It is to be noted that the TDF may be a standalone unit (in which case a separate interface, such as an Sd interface or reference point, is provided to a policy and charging rules function (to be described later)), or may be collocated as an ADC with a PCEF in the P-GW 45. PCEF 45 and TDF 46 are configured to fulfill several functions, such as traffic detection for identifying and measuring (Internet) data traffic, including over-the-top services, policy enforcement for applying direct and indirect management to ensure optimal traffic flow, and charging enforcement.

Reference sign 20 denotes a service selection control and policy and charging rules element or function. For example, an SCF/API GW function 25 and PCRF 26 are implemented for executing a corresponding processing (referred to hereinafter also as SCF/PCRF 20). In this context, the API-GW function 25 is configured, for example, to hosts API framework functions, like providing the API(s) with secured, authenticated and authorized access to capabilities offered by the 3GPP system. The PCRF 26 represents, for example, an entity used for policy and QoS control for a converged network by 3GPP.

For connecting the communication network control element 40 and the SCR/PCRF 20, corresponding reference points or interfaces are to be provided. For example, as shown in the 3GPP system depicted in FIG. 1, a Gx interface is provided for transferring (QoS) policy and charging rules from PCRF to the PCEF in the P-GW 45. Furthermore, as indicated above, in case the TDF 46 is a standalone entity, an Sd interface is used between the TDF 46 and the PCRF 26.

On the external service providing side, such as in a service cloud providing such service functions and/or service function chains, reference sign 30 denotes an external-service providing control element including, for example, gateway (GW) functions, router functions and the like (referred to hereinafter also as SFC/GW/router 30). For example, the SFC/GW/router 30 is configured to manage and control respective service functions 31 in the service cloud, to receive and process service requests and data packets related to one or more service functions 31 (and/or service function chains), and to transmit information, responses, data packets etc. to the communication network. According to examples of embodiments, as interfaces between the SFC/GW/router 30 and the communication network, a management interface, such as an API interface, is established to and from the SCR/PCRF 20. Furthermore, a Gi/SGi reference point is used between the communication network control element 40 (e.g. P-GW or GGSN). Gi/SGi represents the reference point between a GGSN or P-GW and a packet data network, such as an operator external public or private packet data network or an intra operator packet data network.

It is to be noted that even though FIG. 1 shows only one SFC/GW/router functionality controlling a service function chain, it is obvious that also other configurations are feasible. For example, a central controller being in charge of multiple chains is conceivable which may also indicate (as described below) corresponding service function chains, their services and their parameters. Also a plurality of external service clouds or the like may be provided so as to be accessible by the communication network instead of only one as depicted in FIG. 1.

According to examples of embodiments of the invention, an architecture, control procedures and protocols will be described in the following allowing a control of a communication using service function chaining.

Specifically, according to examples of embodiments, concepts are provided allowing the usage of external service functions and/or external service function chains by a communication network, such as a 3GPP based network, by using specific interfaces, such as a Gi/SGi reference point. That is, examples of embodiments of the invention provide a solution allowing a communication network, such as a 3GPP based network, to manage and access e.g. a Gi/SGi external service function chain. Furthermore, a mechanism for the communication network is provided so as to know which services are available at an external service providing side, i.e. in respective external service function chains. Also a generation and provision of service policy rules for service data flows is considered, and a mechanism for the communication network is provided in order to route classified SDFs via determined services as per relevant service policy rules.

According to examples of embodiments, it is suggested to implement principles of a mechanism to expose service capabilities of the external service providing side by means of suitable mechanisms, such as one being based on that the concept of AESE, in order to implement a service chaining procedure that is configured, for example, to support Gi/SGi external service functions. For example, according to some examples of embodiments, a management interface is established between the 3GPP network and the external service function chain.

There are several possibilities for achieving a corresponding control procedure.

For example, according to examples of embodiments, the communication network, e.g. by means of the SCF/PCRF 20, acquires general service policy rules (which can be applied to any SDF) and/or specific service policy rules (which are applicable to one subscriber/user or a specific SDF) and provides one or more of these generated rules to the external service function providing side, e.g. to the SFC/GW/router 30. Such a rule may identify, for example, SDF(s) e.g. by IP filter(s) or by five tuple(s). Furthermore, the rule may also identify one or more service functions and/or service function chains and/or features which is/are to be applied on the external service function providing side to the identified SDF(s). Then, the SFC/GW/router 30 is configured to use, for a SDF, at least one of the generic service policy rules that is applicable.

As indicated above, according to examples of embodiments, a generic or specific policy rule provided to the SFC/GW/router 30 may for example contain information (e.g. an identifier or IP address) to identify a service function chain and/or a service function and/or a feature of a service function and information to identify a service data flow (SDF) to which the identified a service function chain and/or service function or feature is to be applied. An SDF may be identified e.g. through an IP filter (i.e. address and port and/or other IP flow related parameters) or through a five tuple (IP addresses, ports and protocol).

According to examples of embodiments, the generic service policy rules are acquired, for example, by generating the rules, by referring to information provided by configuration settings (pre-stored generic service policy rules) or by processing information obtained by a third entity.

According to examples of embodiments, generic service policy rules being acquired by the SCF/PCRF 20 include, for example, rules being statically set, i.e. which are valid until the generic service policy rules are made invalid. Alternatively or additionally, at least a part of the generic service policy rules can be dynamically changeable. That is, dynamically changeable generic service policy rules can be changed or updated in accordance with an occurrence of specific events, for example, when a certain time of a day is reached (e.g. at night time), or at specific days (e.g. during weekend, on holidays) etc.

In addition, it is possible that the communication network, e.g. by means of the SCF/PCRF 20, generates routing rules (which can be applied to any SDF) and/or additional routing rules (which are applicable to one subscriber/user or a specific SDF) and provides one or more of these generated rules to the communication network control element (e.g. the P-GW/TDF 40) being in charge for the specific user. Such a rule may identify, for example, SDF(s) that is/are to be routed via the external service function providing side. Then, the P-GW/TDF 40 is configured to route an SDF to the external service function providing side.

According to examples of embodiments, the routing rules are acquired, for example, by generating the rules, by referring to information provided by configuration settings (pre-stored routing rules) or by processing information obtained by a third entity.

Alternatively, the P-GW/TDF 40 is configured, e.g. by configuration setting, to route any SDF to the external service function providing side, wherein in such a case routing rules are not required. That is, all user plane packets are forwarded automatically to the service function providing side. For example, this option is possible when the SFC/GW/router 30 is controlled by an operator of the communication network, or when it is integrated into the P-GW/TDF 20, for example.

According to examples of embodiments, it is possible, for example, that in case the SFC/GW/router 30 finds none of the provided policy rules is applicable, or in case at least one of requested services or features is not available as requested in the provided policy rules, the SFC/GW/router 30 informs the communication network, i.e. the SCF/PCRF 20 accordingly. Then, the SCF/PCRF 20 determines whether a revision of the policy rules is possible, and if so, revises the policy rules accordingly and provides the revised policy rules to the SFC/GW/router 30 (which in turn conducts again a processing as described above).

Furthermore, according to some examples of embodiments, in case the SFC/GW/router 30 finds more than one of the provided policy rules as being applicable, the SFC/GW/router 30 is configured to either choose one of the rules or to merge a plurality of those rules that are applicable. Similarly, the SFC/GW/router 30 may also be configured to select a suitable service function chain or to apply multiple service chains.

According to examples of embodiments, the SCF and/or PCRF (as separate functions or as an integrated function) is/are configured to generate service policy rules for service data flows (SDF). Service policy rules being generated by the SCF/PCRF 20 include, for example, generic service policy rules or specific service policy rules. For example, the policy rules include a number of parameters with values or value ranges. For example, according to examples of embodiments, the SCF/PCRF 20 is configured to access to a subscription profile of a user/subscriber, for example by referring to any of SPR/UDR/HSS. Relevant content thereof is then used as input information for the creation/generation of user/UE related service policy rules (also referred to as specific service policy rules).

According to further examples of embodiments, service policy rules are acquired when the SCF/PCRF 20 detects that a certain triggering event happens.

For example, an event triggering an activation of (specific) service policy rules (which may be specific to a UE or subscriber/user) and hence that the corresponding service policy rules are to be acquired, may include one of the following: an attachment of a UE or subscriber/user to the communication network, an initiation of an application requiring a SDF, an activation of a service, an update of a UE or subscriber/user, a specified time point (e.g. a certain daytime or a certain date), an elapse of a specified period of time (e.g. time elapsed after a first initiation of a service usage), a traffic load situation (congestion level in the communication network), a change of a location of the UE or subscriber/user (e.g. entry into the home network area of the UE or subscriber/user), etc.

Moreover, according to some examples of embodiments, the service policy rules may be acquired in different ways. For example, (specific) service policy rules can be generated by the SCF/PCRF 20, for example, when a requirement for service policy rules is determined (e.g. due to the detection of a triggering event or the like). Alternatively or additionally, pre-stored information indicating the specific service policy rules may be used. For example, "dormant" service policy rules being pre-stored in the network (e.g. a home subscriber server or the like) can be acquired by activating these "dormant" rules when required.

For example, according to examples of embodiments, in case a communication element such as a UE attaches to the communication network via a corresponding access network, the SCF/PCRF 20 is configured to send relevant service policy rules to the external service function providing side (e.g. the SFC/GW/router 30) and/or relevant routing rules to the communication network control element, such as a corresponding P-GW/TDF, being in charge for the attached UE.

According to further examples of embodiments, the external-service providing side, e.g. a controller function thereof like the SFC/GW/router 30, may use suitable interfaces towards the communication network, for example an API or a Gi/SGi reference point, for indicating (e.g. advertising or offering) available service functions or service function chains (i.e. SF 31), and their capabilities to the communication network side, where a service capability function like the SCF 25 processes the indicated service functions or service function chains. The SCF decides, for example, to use, or subscribe to, one or more of the indicated service function chains or service functions and possibly their selected capabilities. In this way, it is possible that the communication network is able to use also its own (internal) service functions when ever available or appropriate, while a complementation of the (own) services with the indicated external service functions is also possible.

Alternatively or additionally, the communication network side knows about the availability of service function chains and/or service functions and/or the features of service functions by other sources, e.g. by pre-configuration or through an enquiry from a third entity. In other words, according to examples of embodiments, the indicating of service functions or service function chains does not necessarily require a signaling of corresponding data from an external service function providing side (e.g. a service cloud or the like); corresponding data can also be indicated and hence received or acquired from another source (third party) or received and stored in a configuration process.

According to further examples of embodiments, service policy rules, but also subscriptions service functions or service function chains, are updated to new settings or configurations. For example, the update is executed in response to an indication from the external service function providing side. Alternative, also the communication network may trigger a corresponding update.

For example, when considering the above described example in a configuration like that shown in FIG. 1, the Gi/SGi user plane reference point may be used for routing given or classified SDFs via determined service functions. When the P-GW/TDF 40 detects an (application) data packet, e.g. a data packet being related to a start of an application, it is checked whether there are routing rules for the detected application or the SDF thereof. In case a corresponding routing rule is detected, the P-GW/TDF 40 is configured to forward the data packet so as to route it to the external service function providing side. As indicated above, according to some further examples of embodiments, each user data packet is forwarded to the external service function providing side in case a corresponding configuration setting is present in the P-GW/TDF 40. Then, on the external service function providing side, e.g. in the SFC/GW/router 30, the data packet is handled appropriately, e.g. by applying the service policy rules (generic/specific) being provided beforehand, in order to route the data packet to and within the relevant service function (chain).

In the following, referring to FIGS. 2 to 4, operations of the communication system being based, for example, in the above described examples of embodiments are discussed in further detail.

Figure 2:
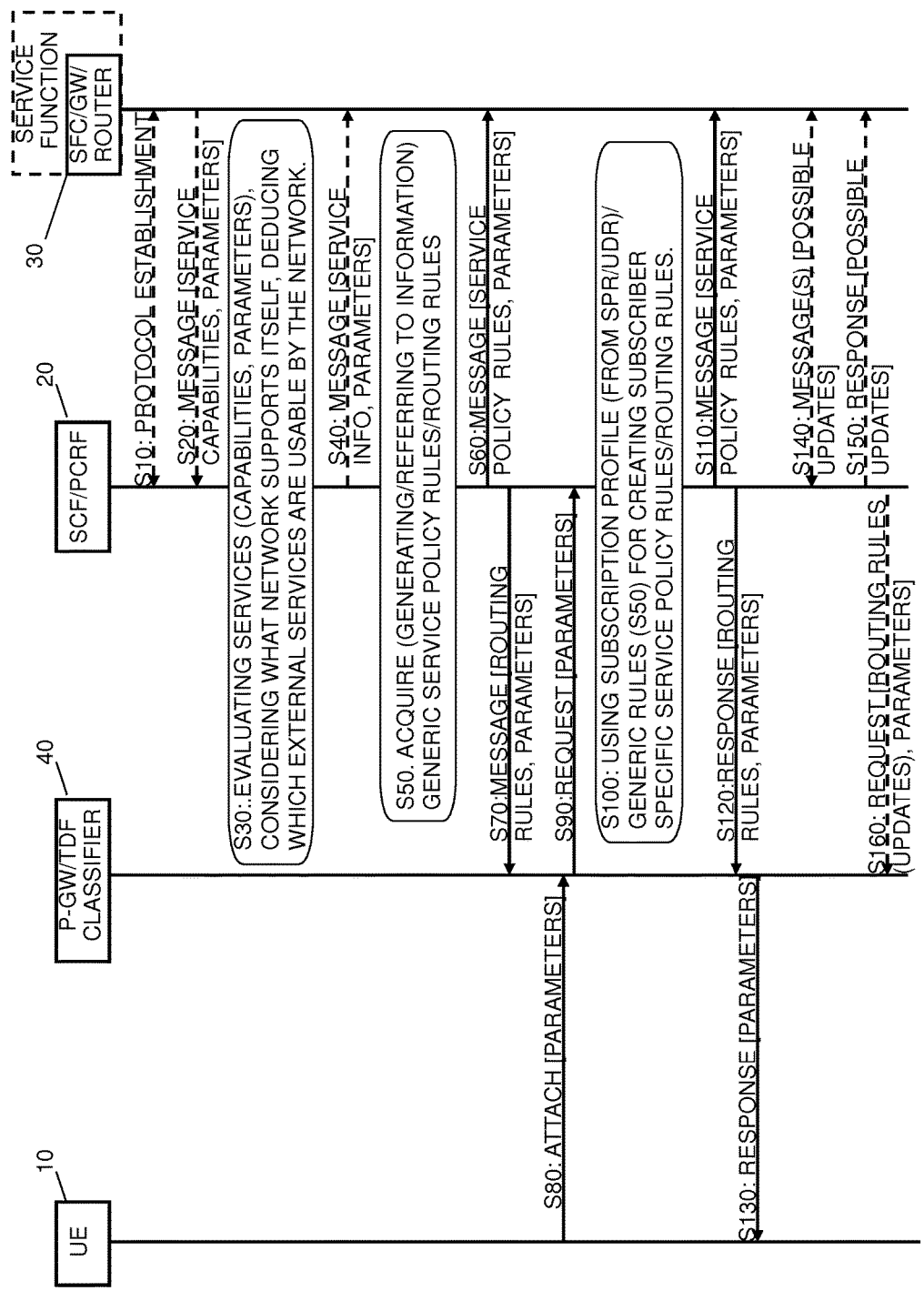
FIG. 2 shows a signaling diagram illustrating a processing according to some examples of embodiments.

FIG. 2 shows a signaling diagram illustrating a corresponding control processing according to some examples of embodiments which correspond to the above described procedure. Specifically, FIG. 2 is related to a processing according to the above described example wherein a policy rule/routing rule creation is conducted, including a provision of service policy rules to the external service function providing side. Furthermore, an option is implemented that there is a service function advertisement using a signaling by the external service function providing side. It is to be noted that the signaling partners indicated in FIG. 2 are related, for example, to the elements shown in FIG. 1.

In S10, a control protocol is established between the external service function chain or chains (e.g. the SFC/GW/router 30) and the 3GPP network via a specific interface, for example over the Gi/SGi reference point or over an API.

In S20 (which is related to the optional case of indicating, e.g. advertising service functions, and hence could be omitted in other examples), the SFC/GW/router 30 indicates for the service function chain available service functions, wherein according to examples of embodiments also their capabilities can be indicated. As additional parameters, an indication of one or more tags or one or more IDs can be included which can be used for identifying corresponding service functions for SDFs (i.e. when SDFs are routed via the relevant service function chain, as described below).

It is to be noted that according to some examples of embodiments, the indication of one or more tags or IDs includes, for example, the tags or ID elements as such; alternatively or additionally, also other information, for example, an index number or the like, from which a corresponding tag or ID can be deduced, can be used as an indication of one or more tags or IDs.

In S30 (which is also related to the optional case of indicating, e.g. advertising service functions, and hence could be omitted in other examples), the SCF/PCRF 20 conducts a processing in which it evaluates the offered service capabilities and related parameters. In addition, in the processing of S30, it is also considered what the 3GPP network supports itself (e.g. own service functions of the communication network). Then, it deduces which of the offered services/service functions are usable by the communication network.

In S40 (which is also related to the optional case of indicating, e.g. advertising service functions, and hence could be omitted in other examples), the SCF/PCRF 20 sends a response to the SFC/GW/router 30 of the service function chain. The response indicates, for example, those service functions (and possibly their capabilities) which the communication network intends to use and/or intends to subscribe to.

In S50, the SCF/PCRF 20 acquires generic service policy rules for the services/service functions which are to be provided to the external service function providing side. According to examples of embodiments, such a generic service policy rule is configured to identify SDF(s), e.g. by one or more IP filters or by one or more five tuples. Furthermore, a rule may also be configured to identify a service function chain, a service function or service functions and/or features that are to be applied in the service function (chain) to the identified SDF(s). As indicated above, generic service policy rules may be, according to examples of embodiments, static and/or dynamically changeable. Furthermore, acquiring of the generic service policy rules may include one of generating/creating the generic service policy rules, referring to information provided in configuration settings, or processing information received from a third entity. Furthermore, in S50, routing rules are acquired which are to be provided to the communication network side. The routing rules identify, for example, SDF(s) which are to be routed via the service function (chain), i.e. the external service function providing side. Again, as indicated above, acquiring of the routing rules may include one of generating/creating the routing rules, referring to information provided in configuration settings, or processing information received from a third entity.

In S60, the generic service policy rules (if acquired) including required parameters are transmitted from the SCF/PCRF 20 to the external service function providing side, e.g. the SFC/GW/router 30.

Furthermore, in S70, in case routing rules are acquired, the corresponding routing rules together with required parameters are sent to the communication network, e.g. the P-GW/TDF 40.

In S80, it is assumed that a communication element, such as the UE 10, attaches to the communication network via an access network subsystem, for example (see FIG. 1).

In S90, the P-GW 40 as the core network control element being related to the attached UE 10 sends an authorization request to the PCRF.

In S100, the SCF/PCRF 20 generates subscriber specific service policy rules which are to be provided to the external service function providing side, wherein it may use, for example, information derived from a subscription profile of the UE 10 (derived e.g. from corresponding SPR/UDR) and the generic service policy rules (as created in S50). That is, according to this example, as a trigger event, an attachment of UE 10 is assumed, while other trigger events as discussed above may also be applicable. Moreover, it is to be noted that in case the SCF function 25 and the PCRF function 26 are not integrated/collocated in one element or function 20, the PCRF function 26 is configured to communicate with the SCF function 25 or a related database (not shown) in order to obtain the generic service policy rules related to services allowed for the subscriber of UE 10. Furthermore, in S100, routing rules may be acquired which are to be provided to the communication network side.

In S110, the subscriber specific service policy rules (if acquired) including required parameters are transmitted from the SCF/PCRF 20 to the external service function providing side, e.g. the SFC/GW/router 30.

In S120, the SCR/PCRF 20 sends a response to the P-GW 40. The response contains, for example, the routing rules acquired in S100

In S130, the P-GW 40 sends a response towards the UE 10.

According to examples of embodiments, as indicated above, it is possible that updates are required, e.g. in response to an indication from the communication network or from the external service function providing side. In the example of FIG. 2, for example, it is assumed that the updates are required for a status of available service functions, capabilities thereof, parameters, subscription data etc. related to the external service functions or external service functions chains. In such a case, for example, as indicated in S140, the service function providing side (e.g. the SFC/GW/router 30) indicates the necessity of such an update e.g. of the status of the available service functions and/or their capabilities or parameters to the communication network. The SCF/PCRF 20 conducts then a processing in order to update service policy rules and/or a subscription to service capabilities offered by the external service function providing side. In addition, SCF/PCRF 20 conducts also a processing (if applicable) in order to update routing rules so as to make them compliant with possibly updated service policy rules. Examples for a necessity of an update are, for example, an unavailability or congestion or re-availability of corresponding services in the communication network, an increase or a reduction of service function resources, e.g. by means of increasing or reducing the number of available service function instances or VNFs in order to adapt the available resources to a load status of the (virtual) network.

In S150, the SCF/PCRF 20 updates corresponding service policy rules and informs the SFC/GW/router 30.

In S160, the SCF/PCRF 20 updates corresponding routing rules and informs the P-GW/TDF 40.

Figure 3:
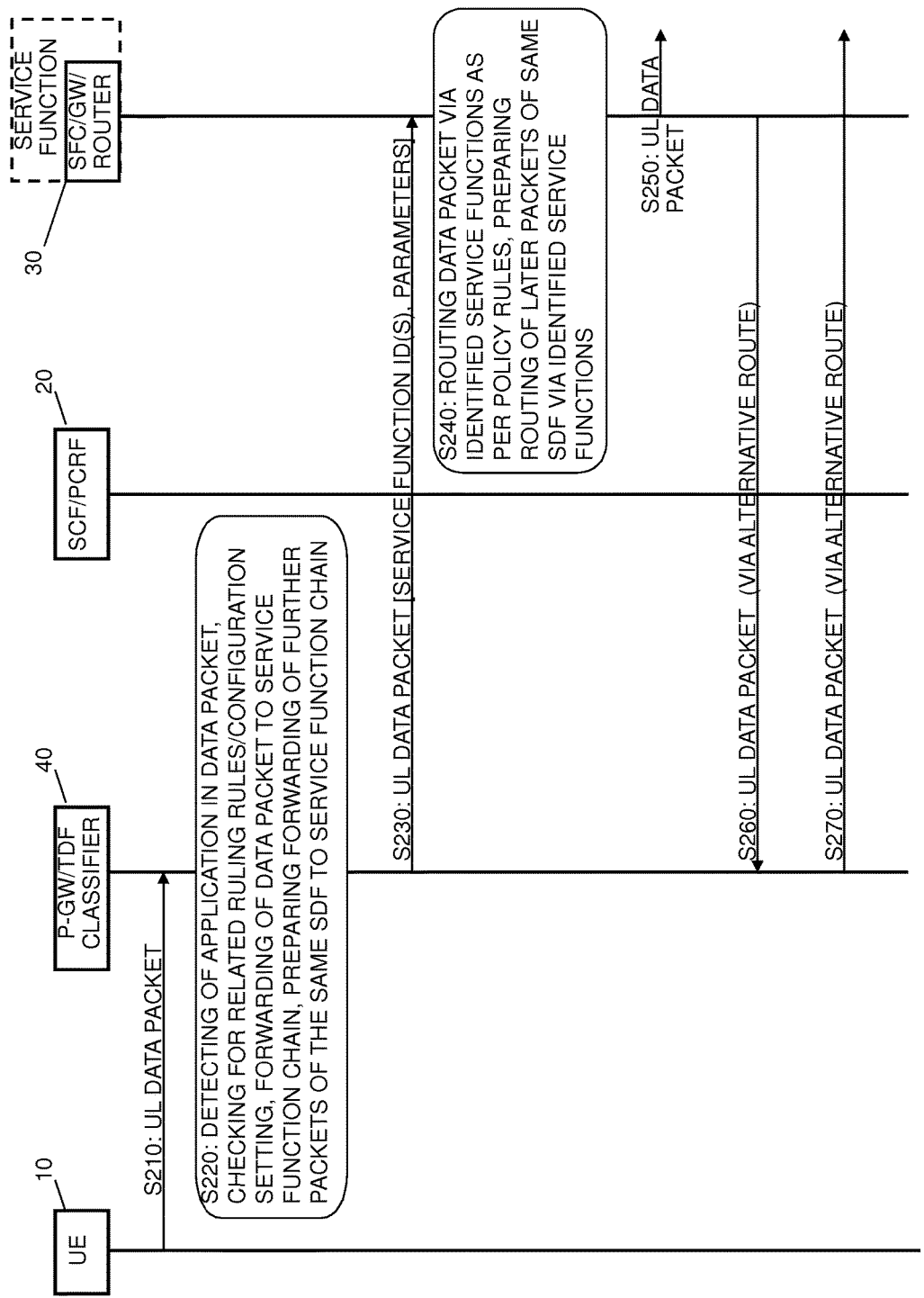
FIG. 3 shows a signaling diagram illustrating a processing according to some examples of embodiments.

Next, with regard to FIG. 3, a signaling diagram illustrating a control processing according to some examples of embodiments which correspond to the above described procedure is shown. Specifically, FIG. 3 is related to a processing where an UL traffic detection and routing is explained. It is to be noted that the signaling partners indicated in FIG. 3 are also related, for example, to the elements shown in FIG. 1.

In S210, the P-GW/TDF 40 (which is provided, for example, with a packet classifier function) receives an UL data packet from the UE 10.

In S220, the P-GW/TDF 40 conducts a processing for detecting an application in the received UL data packet and for checking (when the application in the received UL data packet is detected) whether there is/are routing rule/rules available to this UE 10 (i.e. subscriber specific) or the SDF of the UL data packet. If the presence of corresponding rules is detected, the P-GW/TDF prepares to forward the data packet as well as further data packets of the same SDF to the external service function providing side. As an alternative, the P-GW/TDF 40 may be configured to forward all user data packets to the external service function providing side (in which then service policy rules may be applied to the user data packets); in this case, a routing rule is not required to be considered.

In S230, the P-GW/TDF/classifier 40 forwards the data packet to the service function chain (i.e. the SFC/GW/router 30).

In S240, the SFC/GW/router 30 of the service function chain conducts a processing for routing the data packet via identified service functions or service function chains. That is, the SFC/GW/router 30 applies the service policy rules (generic and/or subscriber specific) as received in S60 or S110 of FIG. 2) to the received data packet in order to route it to and within the service function or service function chain being of relevance. In this connection, also preparations to route later packets of the same SDF via the identified service functions are made.

In S250, the SFC/GW/router 30 causes a transmission of the UL data packet towards its destination.

As an alternative to S250, it is also possible that the UL data packet is transmitted to its destination via the communication network. In this case, the SCF/GW/router 30 routes the data packet back to P-GW/TDF 40 in S260.

Then, P-GW/TDF 40 forwards the UL data packet towards its destination in S270.

Figure 4:
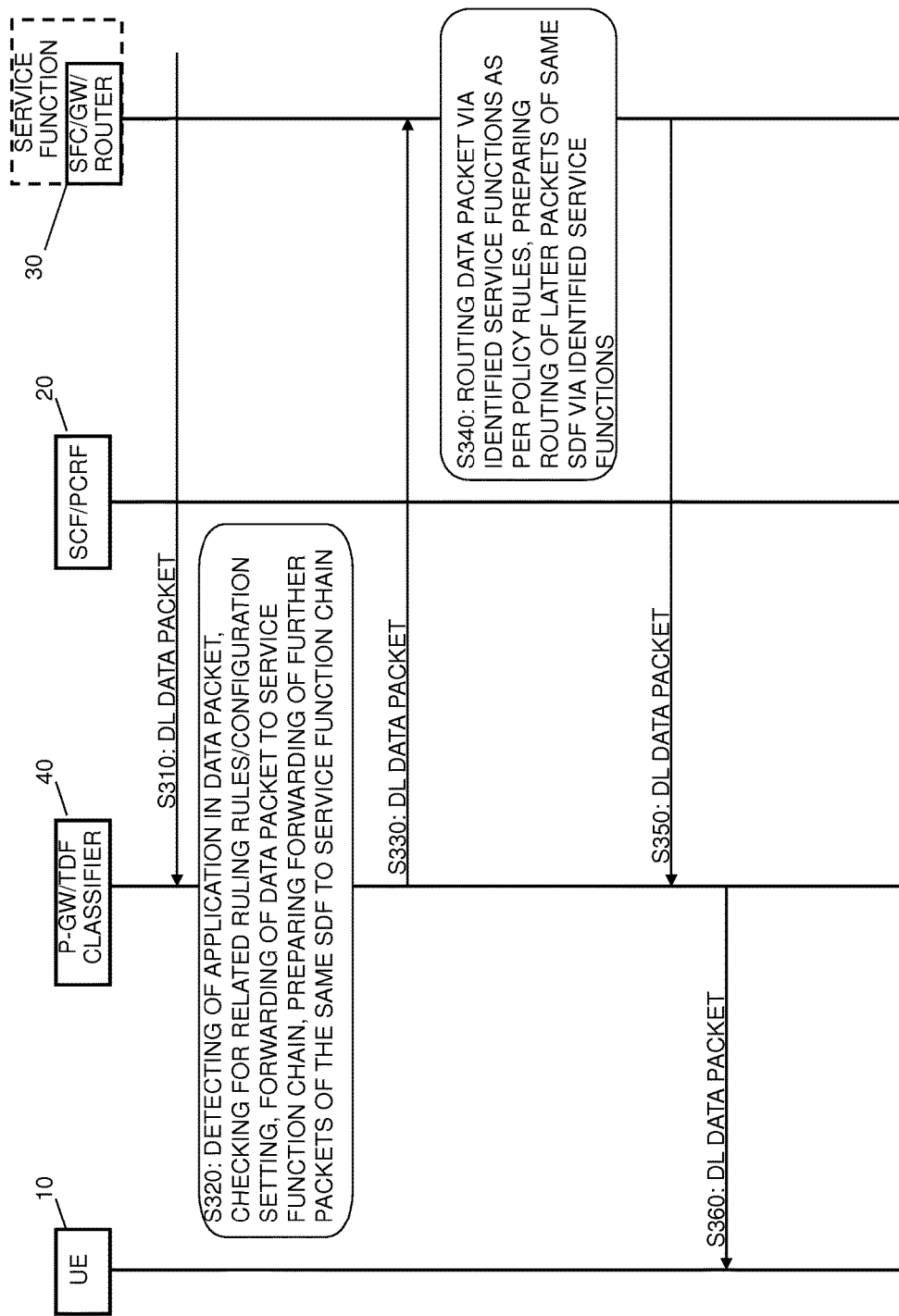
FIG. 4 shows a signaling diagram illustrating a processing according to some examples of embodiments.

Next, with regard to FIG. 4, a signaling diagram illustrating a control processing according to some examples of embodiments which correspond to the above described procedure is shown. Specifically, FIG. 4 is related to a processing where a DL traffic detection and routing is explained. It is to be noted that the signaling partners indicated in FIG. 4 are also related, for example, to the elements shown in FIG. 1.

In S310, the P-GW/TDF 40 receives a DL data packet for UE 10.

In S320, the P-GW/TDF 40 conducts a processing for detecting an application in the received DL data packet and for checking (when the application in the received DL data packet is detected) whether there is/are routing rule/rules available to the UE 10 (i.e. subscriber specific) or the SDF of the DL data packet. If the presence of corresponding rules is detected, the P-GW/TDF 40 prepares to forward the data packet as well as further data packets of the same SDF to the external service function providing side. As an alternative, the P-GW/TDF 40 may be configured to forward all user data packets to the external service function providing side (in which then service policy rules may be applied to the user data packets); in this case, a routing rule is not required to be considered.

In S330, the P-GW/TDF/classifier 40 forwards the data packet to the service function chain (i.e. the SFC/GW/router 30).

In S340, the SFC/GW/router 30 of the service function chain conducts a processing for routing the data packet via identified service functions or service function chains. That is, the SFC/GW/router 30 applies the service policy rules (generic and/or subscriber specific) as received in S60 or S110 of FIG. 2) to the received data packet in order to route it to and within the service function or service function chain being of relevance. In this connection, also preparations to route later packets of the same SDF via the identified service functions are made.

In S350, the SCF/GW/router 30 causes a transmission of the UL data packet towards its destination, i.e. the UE 10, via the communication network (i.e. via the P-GW/TDF 40).

Then, P-GW/TDF 40 forwards the DL data packet towards its destination, i.e. the UE 10, in S360.

Figure 5:
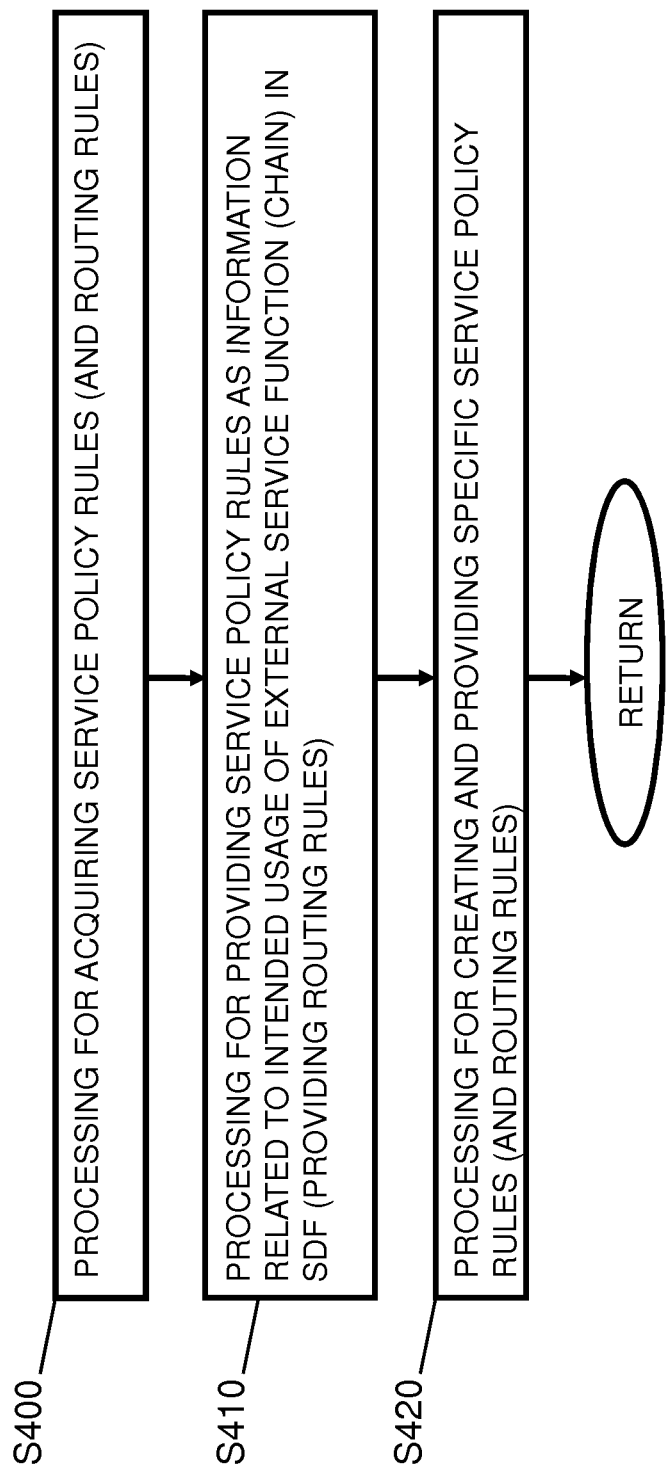
FIG. 5 shows a flow chart of a processing conducted in a service selection control function according to some examples of embodiments.

FIG. 5 shows a flow chart of a processing conducted in a service selection control function (and/or policy and charging rules function), such as the SCF/PCRF 20, according to some examples of embodiments. Specifically, the example according to FIG. 5 is related to a control procedure conducted by the communication element or node acting as a SCF/PCRF in the communication network as depicted e.g. in FIG. 1, which is connectable to an external service providing side (e.g. to SFC 30) by means of a suitable interface, such as API.

In S400, service policy rules to be applied to a communication of a SDF in a communication network are acquired. The service policy rules are to be used for routing data packets of a SDF to and within at least one external service function or at least one external service function chain. For example, according to examples of embodiments, as the service policy rules, generic service policy rules are acquired. For example, the generic service policy rules may be created, or information provided by a configuration and including information related to the generic service policy rules may be referred to and used, or information obtained from a third entity may be used for derive the generic service policy rules.

According to examples of embodiments, the generic service policy rules include at least one of an ID information for the service data flow, an ID information for a service function or service function chain via which the service data flow is to be routed, and rules for a usage of the service function or service function chain via which the SDF is to be routed.

Furthermore, according to examples of embodiments, the generic service policy rules includes at least one of a static generic service policy rule part and a dynamically changeable generic service policy rule part, wherein the dynamically changeable generic service policy rule part is changeable with regard to an occurrence of a specific event, such as a certain daytime or the like.

In S410, the acquired service policy rules are provided to an external service function providing side as information related to an intended usage of at least one external service function or external service function chain in a SDF communicated in a communication network.

It is to be noted that in addition to acquiring and providing the service policy rules in S400 and S410, it is also possible to acquire routing rules to be applied to the communication of a SDF in the communication network. The routing rules are to be used for identifying a SDF to be routed to and within at least one external service function or at least one external service function chain. Then, the routing rules are provided to a communication network control element (such as the P-GW 40).

In order to acquire the routing rules, it is possible to conduct one of the following processings: creating the routing rules, referring to set configuration information including information related to the routing rules, or processing information obtained from a third entity.

In addition to S400 and 410, in S420, specific service policy rules being specific to a communication element or user are acquired. The specific service policy rules are to be used for routing the SDF to and within at least one external service function or at least one external service function chain. The specific service policy rules are (also) provided to the external service function providing side.

For example, according to an example of an embodiment, the processing in S410 includes a determination or detection that an event triggering an activation of specific service policy rules being specific to a UE or user occurred, and then to acquire the specific service policy rules whose activation is triggered. For example, an event triggering the activation of the specific service policy rules includes at least one of an attachment of a UE or user (like UE 10) to the communication network, an initiation of an application requiring a SDF, an activation of a service, an update of a subscription of a UE or user, a specified time point, an elapse of a specified period of time, a traffic load situation, a change of a location of the communication element or used, and the like. Furthermore, the acquiring of the specific service policy rules includes at least one of generating the specific service policy rules and obtaining pre-stored information indicating the specific service policy rules. Then, specific service policy rules corresponding to the communication element (e.g. UE 10) in question are created or retrieved, which are to be used for routing a SDF to and within at least one external service function or external service function chain.

Similarly to the above described case of generic policy rules, also in case of a specific service policy rule, it is possible to create additional routing rules to be applied to the communication of the SDF in the communication network. The additional routing rules are to be used for identifying a relevant SDF to be routed to at least one external service function or external service function chain. The additional routing rules are provided to a communication network control element, like the P-GW 40.

If necessary, according to some examples of embodiments, also an update of settings and parameters can be conducted, for example in response to a corresponding indication by the external service function providing side or by the communication network making such an update necessary. The updating concerns, for example, at least one of generic service policy rules, specific service policy rules and routing rules.

Then, the processing may return.

Figure 6:
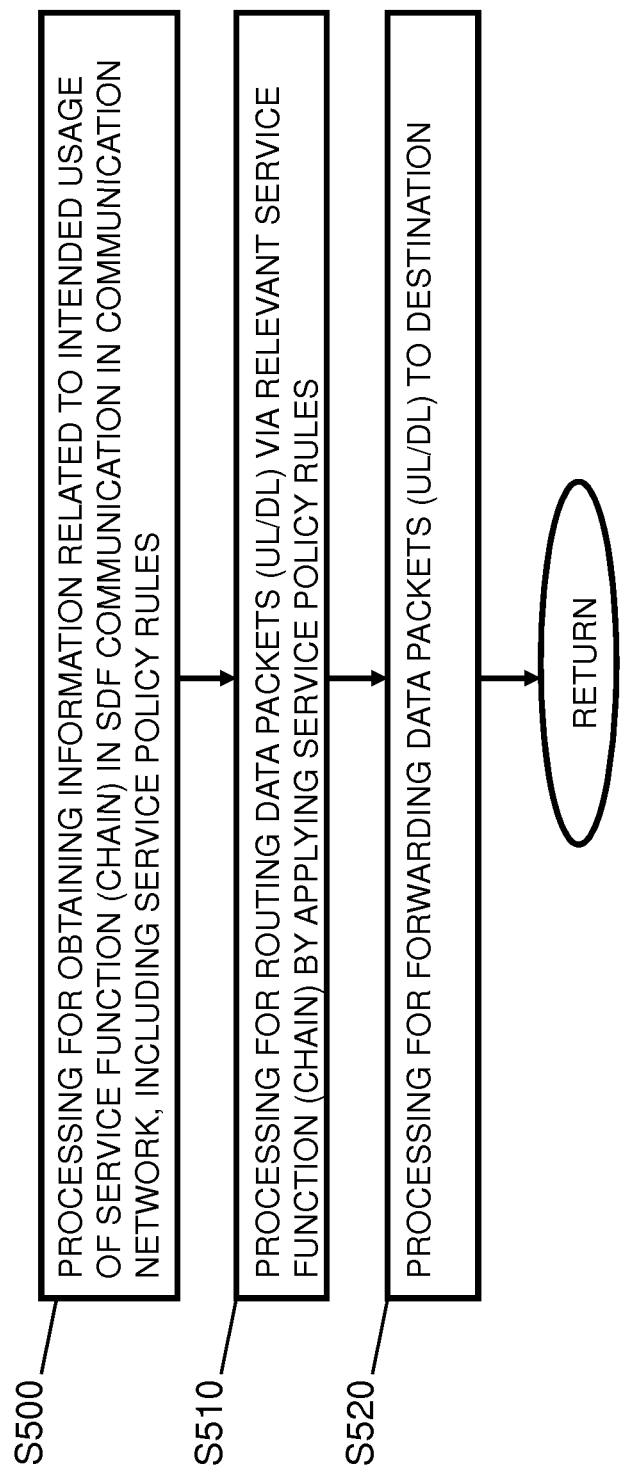
FIG. 6 shows a flow chart of a processing conducted in a control function on an external service function providing side according to some examples of embodiments.

FIG. 6 shows a flow chart of a processing conducted in a control function on an external service function providing side, such as the SFC/GW/router 30, according to some examples of embodiments. Specifically, the example according to FIG. 6 is related to a control procedure conducted by the control element or node acting as a SFC/GW/router 30 in the service cloud as depicted e.g. in FIG. 1.

In S500, information related to an intended usage of at least one external service function or external service function chain in a SDF communicated in a communication network is obtained. The information includes service policy rules to be used for routing a SDF to at least one external service function or external service function chain.

For example, the policy rules includes generic service policy rules including at least one of an identification information for the SDF, an identification information for a service function or service function chain via which the SDF is to be routed, and rules for a usage of the service function or service function chain via which the SDF is to be routed.

Furthermore, according to examples of embodiments, as at least a part of the service policy rules, specific service policy rules being specific for a communication element or user attached to the communication network are received and processed. The specific service policy rules are to be used for routing the SDF to at least one external service function or external service function chain.

The processing of S500 may include also a processing for determining of whether and which one of the generic policy rules and specific policy rules to be used for routing the SDF can be applied, or whether requested service functions or service function chains are available. In case the determination of whether the generic policy rules and specific policy rules to be used for routing the SDF can be applied results in an incompatibility of the generic policy rules and specific policy rules, or of whether requested service functions or service function chains are available results in an non-availability of requested service functions or service function chains, a request for an update of service policy rules (generic service policy rules or specific service policy rules) or a change of the requested service functions or service function chains is issued.

In S510, the service policy rules are applied to routing data packets of a service data flow to and within at least one external service function or external service function chain as indicated in the service policy rules.

That is, for example, when at least one UL or DL data packet is received from the communication network, at least one of the generic service policy rules and the specific service policy rules are applied to routing the UL or DL data packet according to the corresponding rules for the SDF of the data packet via at least one service function or service function chain.

According to further examples, there may also be done a preparation for routing of later UL or DL data packets of the same SDF like the received UL or DL data packet via the at least one service function or service function chain.

In S520, the UL or DL data packet is forwarded to a destination in the UL direction or in the communication network.

Figure 7:
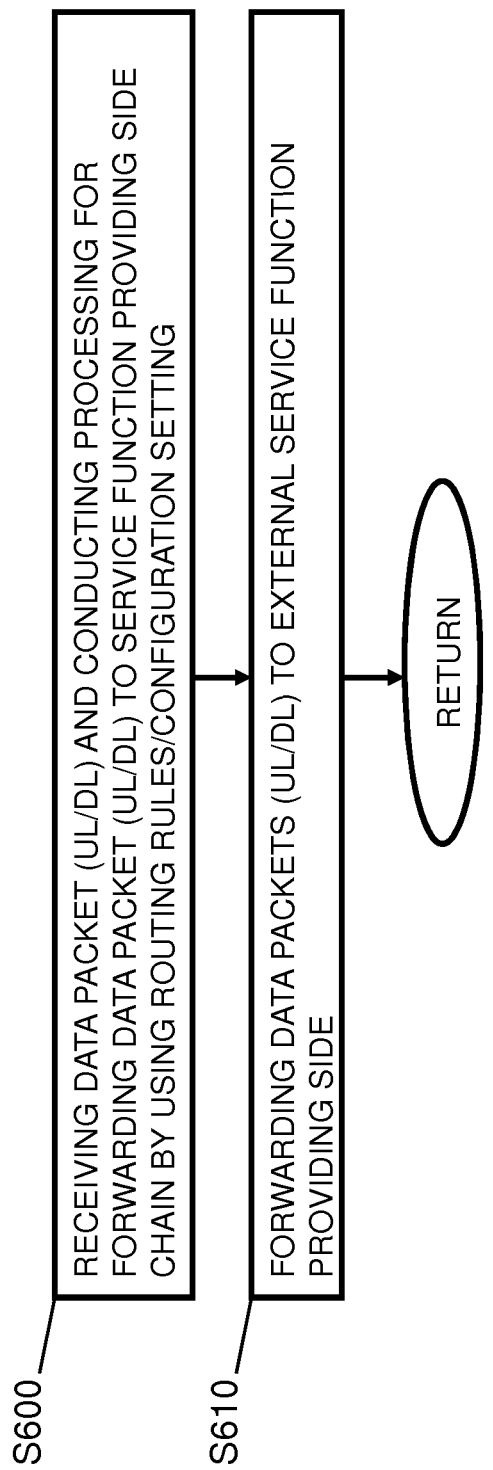
FIG. 7 shows a flow chart of a processing conducted in a communication network control function according to some examples of embodiments.

FIG. 7 shows a flow chart of a processing conducted in a communication network control function, such as the P-GW/TDF 40, according to some examples of embodiments. Specifically, the example according to FIG. 7 is related to a control procedure conducted by the communication network control element or node acting as a P-GW/TDF 40 in the communication network as depicted e.g. in FIG. 1.

In S600, a data packet in at least one of UL and DL direction is received. Then, a processing is conducted so as to route or forward the data packet. For example, it is checked whether for the received data packet any routing rules or configuration settings to be used for routing a SDF of the data packet to at least one external service function or external service function chain are present.

For example, when routing rules are available, the routing rules can be used for identifying a SDF to be routed to at least one external service function or external service function chain. The routing rules may be acquired from a communication network control element configured to act as at least one of a service selection control function and policy and charging rules function.

Furthermore, when routing rules or configuration setting is present, also a preparation for a routing of later data packets of the same SDF like the received data packet via the relevant external service function or external service function chain may be done.

In S610, in case the check results in that there are routing rules or configuration settings to be used for forwarding the SDF to at least one external service function or external service function chain, the received data packet is forwarded to the at least one external service function or external service function chain.

Figure 8:
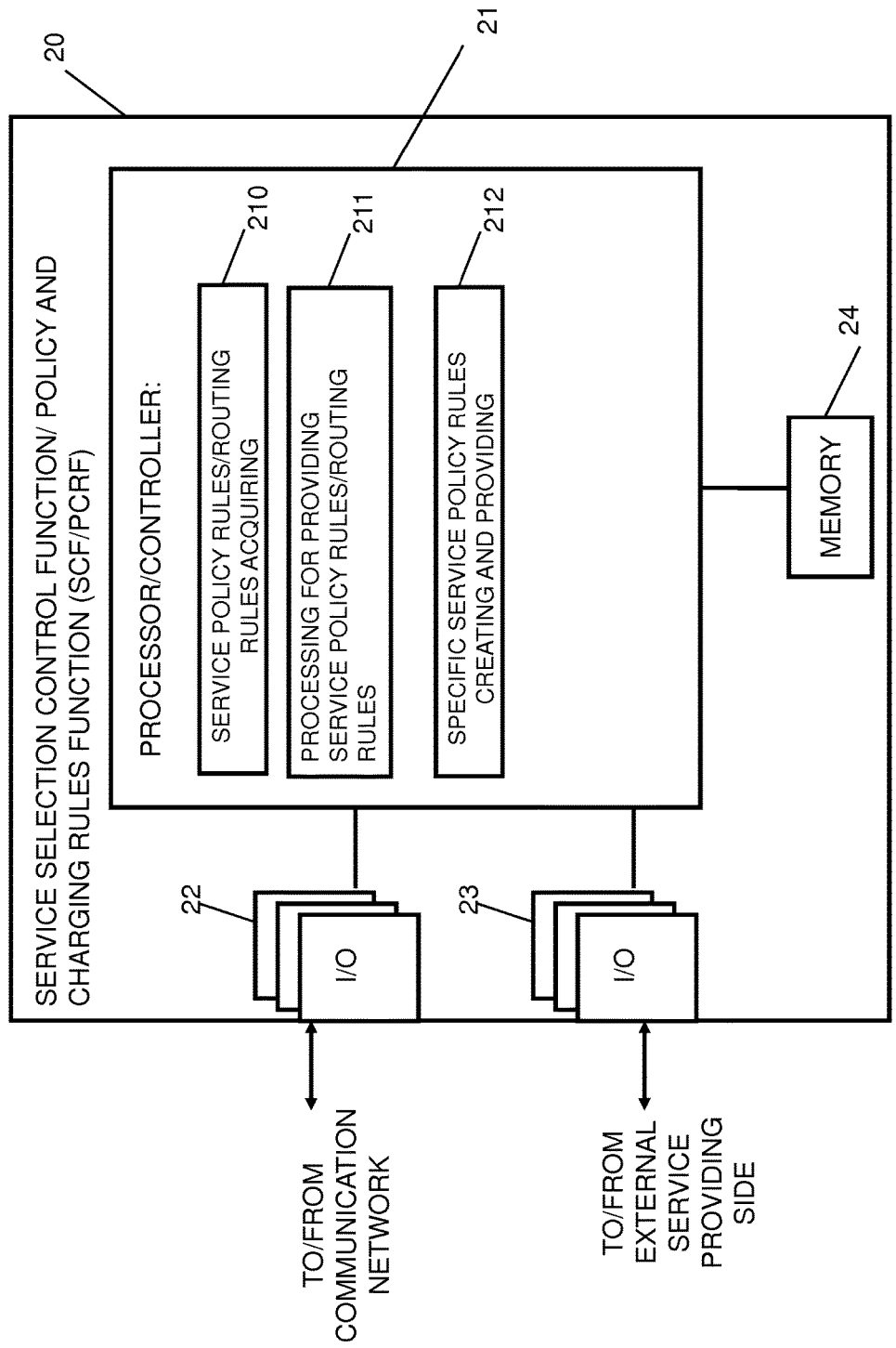
FIG. 8 shows a diagram of a network element acting as a service selection control function according to some examples of embodiments.

FIG. 8 shows a diagram of a network element acting as a service selection control function and policy and charging rules function according to some examples of embodiments, which is configured to implement a control procedure as described in connection with some of the examples of embodiments. It is to be noted that the network element, like the SCF/PCRF 20, which is shown in FIG. 8, may include further elements or functions besides those described herein below. Furthermore, even though reference is made to a network element or node, the element or node may also be another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The network element shown in FIG. 8 may include a processing circuitry, a processing function, a control unit or a processor 21, such as a CPU or the like, which is suitable for executing instructions given by programs or the like related to the control procedure. The processor 21 may include one or more processing portions or functions dedicated to specific processing as described below, or the processing may be run in a single processor or processing function. Portions for executing such specific processing may also be provided as discrete elements or within one or more further processors, processing functions or processing portions, such as in one physical processor like a CPU or in one or more physical or virtual entities, for example. Reference signs 22 and 23 denote transceiver or input/output (I/O) units or functions (interfaces) connected to the processor or processing function 21. The I/O units 22 may be used for communicating with a communication network, such as a core network element like the P-GW/TDF 40. The I/O units 23 may be used for communicating with an external service function providing side, such as the SFC/GW/router 30. The I/O units 22 and 23 may be a combined unit including communication equipment towards several network elements, or may include a distributed structure with a plurality of different interfaces for different network elements. Reference sign 24 denotes a memory usable, for example, for storing data and programs to be executed by the processor or processing function 21 and/or as a working storage of the processor or processing function 21. It is to be noted that the memory 24 may be implemented by using one or more memory portions of the same or different type of memory.

The processor or processing function 21 is configured to execute processing related to the above described control procedure. In particular, the processor or processing circuitry or function 21 includes one or more of the following sub-portions. Sub-portion 210 is a processing portion which is usable for acquiring service policy rules and/or routing rules. The portion 210 may be configured to perform processing according to S400 of FIG. 5. Moreover, the processor or processing circuitry or function 21 may include a sub-portion 211 usable as a portion for providing information related to an intended usage of service functions or service functions chains in a SDF, i.e. the service policy rules and/or routing information. The portion 211 may be configured to perform processing according to S410 of FIG. 5. Furthermore, the processor or processing circuitry or function 21 may include a sub-portion 212 usable as a portion for creating and providing specific service policy rules. The portion 212 may be configured to perform a processing according to S420 of FIG. 5.

Figure 9:
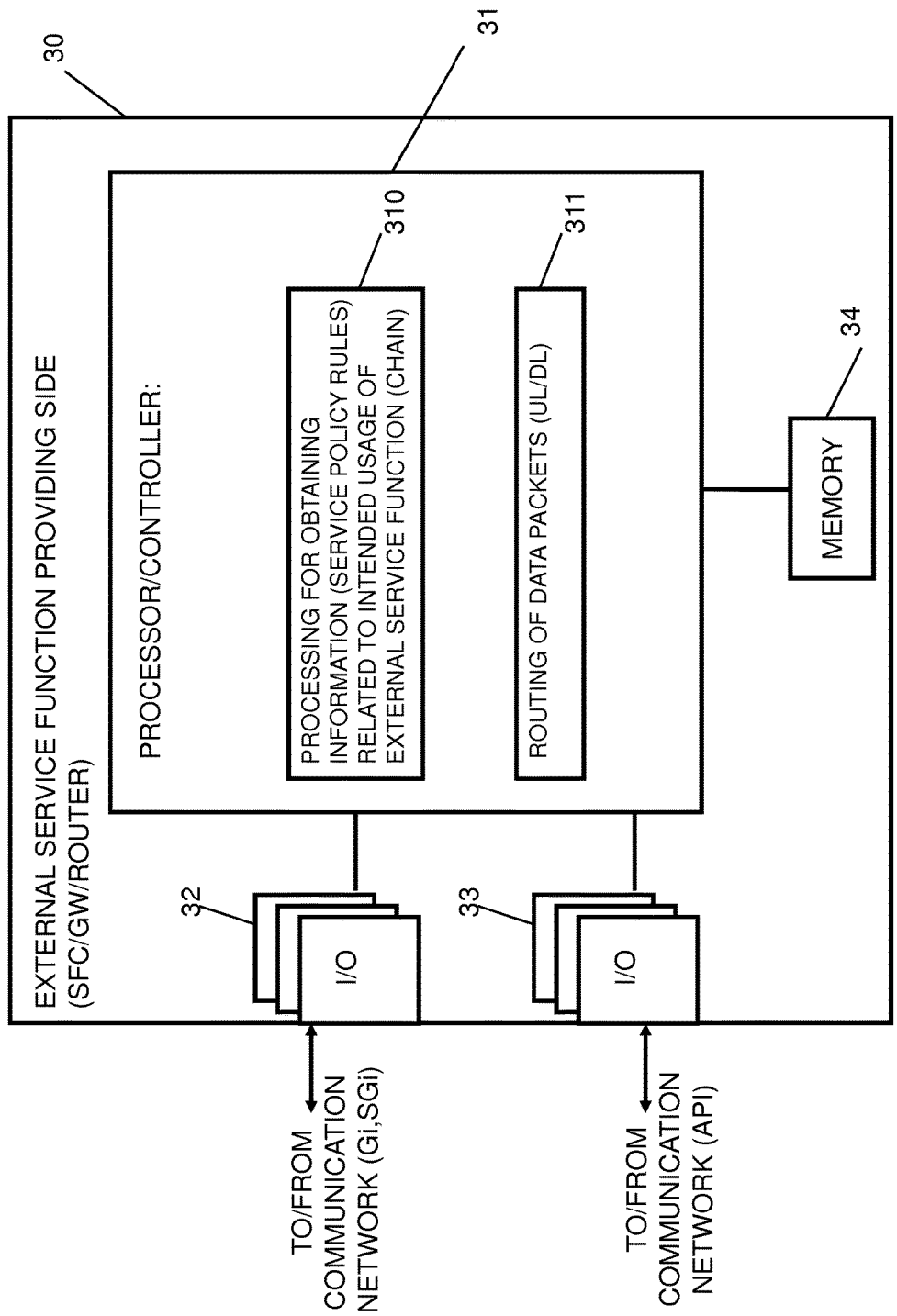
FIG. 9 shows a diagram of a network element acting as a control function on an external service function providing side according to some examples of embodiments.

FIG. 9 shows a diagram of a network element acting as a control function on an external service function providing side according to some examples of embodiments, which is configured to implement a control procedure as described in connection with some of the examples of embodiments. It is to be noted that the network element, like the SFC/GW/router 30, which is shown in FIG. 9, may include further elements or functions besides those described herein below. Furthermore, even though reference is made to a network element or node, the element or node may also be another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The network element shown in FIG. 9 may include a processing circuitry, a processing function, a control unit or a processor 31, such as a CPU or the like, which is suitable for executing instructions given by programs or the like related to the control procedure. The processor 31 may include one or more processing portions or functions dedicated to specific processing as described below, or the processing may be run in a single processor or processing function. Portions for executing such specific processing may also be provided as discrete elements or within one or more further processors, processing functions or processing portions, such as in one physical processor like a CPU or in one or more physical or virtual entities, for example. Reference signs 32 and 33 denote transceiver or input/output (I/O) units or functions (interfaces) connected to the processor or processing function 31. The I/O units 32 may be used for communicating with a communication network, such as a core network element like the P-GW/TDF 40, for example by means of a Gi/SGi reference point. The I/O units 33 may be used for communicating with a communication network, such as a service selection control function like the SCF/PCRF 20. The I/O units 32 and 33 may be a combined unit including communication equipment towards several network elements, or may include a distributed structure with a plurality of different interfaces for different network elements. Reference sign 34 denotes a memory usable, for example, for storing data and programs to be executed by the processor or processing function 31 and/or as a working storage of the processor or processing function 31. It is to be noted that the memory 34 may be implemented by using one or more memory portions of the same or different type of memory.

The processor or processing function 31 is configured to execute processing related to the above described control procedure. In particular, the processor or processing circuitry or function 31 includes one or more of the following sub-portions. Sub-portion 310 is a processing portion which is usable for obtaining information related to an intended usage of service functions or service functions chains in a SDF. The portion 310 may be configured to perform processing according to S500 of FIG. 6. Furthermore, the processor or processing circuitry or function 31 may include a sub-portion 311 usable as a portion for routing (by applying policy rules) or forwarding data packets. The portion 311 may be configured to perform a processing according to S510 or S520 of FIG. 6.

Figure 10:
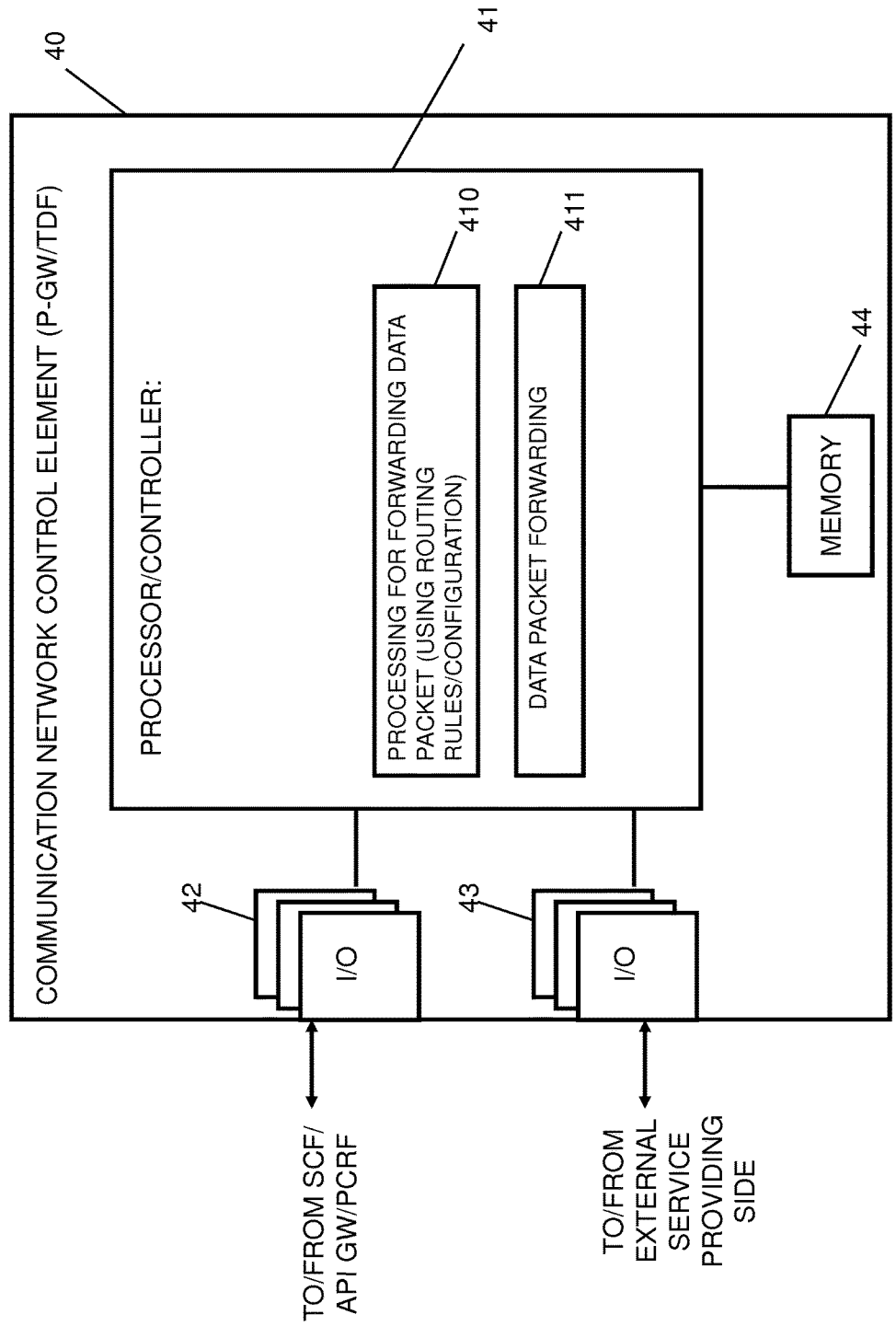
FIG. 10 shows a diagram of a communication network control element according to some examples of embodiments.

FIG. 10 shows a diagram of a communication network control element according to some examples of embodiments, which is configured to implement a control procedure as described in connection with some of the examples of embodiments. It is to be noted that the communication network control element, like the P-GW/TDF 40, which is shown in FIG. 10, may include further elements or functions besides those described herein below. Furthermore, even though reference is made to a communication network control element or node, the element or node may also be another device or function having a similar task, such as a chipset, a chip, a module, an application etc., which can also be part of a communication network control element or attached as a separate element to a communication network control element, or the like. It should be understood that each block and any combination thereof may be implemented by various means or their combinations, such as hardware, software, firmware, one or more processors and/or circuitry.

The communication network control element shown in FIG. 10 may include a processing circuitry, a processing function, a control unit or a processor 41, such as a CPU or the like, which is suitable for executing instructions given by programs or the like related to the control procedure. The processor 41 may include one or more processing portions or functions dedicated to specific processing as described below, or the processing may be run in a single processor or processing function. Portions for executing such specific processing may also be provided as discrete elements or within one or more further processors, processing functions or processing portions, such as in one physical processor like a CPU or in one or more physical or virtual entities, for example. Reference signs 42 and 43 denote transceiver or input/output (I/O) units or functions (interfaces) connected to the processor or processing function 41. The I/O units 42 may be used for communicating with a service selection control function and policy and charging rules function, such as a the SCF/PCRF 20. The I/O units 43 may be used for communicating with an external service function providing side, such as the SFC/GW/router 30. The I/O units 42 and 43 may be a combined unit including communication equipment towards several network elements, or may include a distributed structure with a plurality of different interfaces for different network elements. Reference sign 44 denotes a memory usable, for example, for storing data and programs to be executed by the processor or processing function 41 and/or as a working storage of the processor or processing function 41. It is to be noted that the memory 44 may be implemented by using one or more memory portions of the same or different type of memory.

The processor or processing function 41 is configured to execute processing related to the above described control procedure. In particular, the processor or processing circuitry or function 41 includes one or more of the following sub-portions. Sub-portion 410 is a processing portion which is usable for a processing for forwarding data packets to the external service function providing side. The portion 410 may be configured to perform processing according to S600 of FIG. 7. Furthermore, the processor or processing circuitry or function 41 may include a sub-portion 411 usable as a portion for forwarding data packets to the external service function providing side. The portion 411 may be configured to perform a processing according to S610 of FIG. 7.

By means of the measures described above, it is possible to offer operators an optimized way to support service function chaining. For example, when an architecture as described above is used, in which principles of an AESE architecture are considered, the need for different new entities and interfaces is minimized. Processings related to the described control scheme can be executed in elements, functions or nodes which basically correspond to the SCF/PCRF for policy creation and P-GW/TDF for traffic detection, classification and routing control, as described in examples of embodiments.

Furthermore, according to examples of embodiments, it is possible that the external service function chain is isolated from the communication network so that confidential issues of the communication network are not exposed to an external network (i.e. the service function chain provider).

As indicated above, some examples of embodiments may be applied to a partly or fully virtualized environment comprising one or more VNFs. In this case, some examples of embodiments enable a flexible scale-in and scale-out of resources, i.e. reducing or increasing the number of e.g. service function instances or VNFs in a service function chain, and accordingly updating the availability information towards the communication network (e.g. in S140 of FIG. 2).

According to another example of embodiments, there is provided an apparatus including means for acquiring service policy rules to be applied to a communication of a service data flow in a communication network, wherein the service policy rules are to be used for routing a service data flow to and within at least one external service function or at least one external service function chain; and means for providing, to an external service function providing side, the acquired service policy rules as information related to an intended usage of at least one external service function or at least one external service function chain in a service data flow communicated in a communication network.

Furthermore, according to another example of embodiments, there is provided an apparatus including means for obtaining information related to an intended usage of at least one external service function or at least one external service function chain in a service data flow communicated in a communication network, wherein the information includes service policy rules to be used for routing a service data flow to and within at least one external service function or at least one external service function chain; and means for applying the service policy rules to routing a service data flow to and within at least one external service function or at least one external service function chain.

Furthermore, according to another example of embodiments, there is provided an apparatus including means for receiving a data packet in at least one of uplink and downlink direction; means for checking whether for the received data packet any routing rules or configuration settings to be used for routing a service data flow of the data packet to at least one external service function or at least one external service function chain are present; and means for forwarding, in case the check results in that there are routing rules or configuration settings to be used for routing the service data flow to at least one external service function or at least one external service function chain, the received data packet to the at least one external service function or at least one external service function chain.

It should be appreciated that an access technology via which signaling is transferred to and from a network element may be any suitable present or future technology, such as WLAN (Wireless Local Access Network), WiMAX (Worldwide Interoperability for Microwave Access), LTE, LTE-A, Bluetooth, Infrared, and the like may be used; additionally, embodiments may also apply wired technologies, e.g. IP based access technologies like cable networks or fixed lines.

a user device (also called UE, user equipment, user terminal, terminal device, etc.) illustrates one type of an apparatus to which resources on the air interface may be allocated and assigned, and thus any feature described herein with a user equipment may be implemented with a corresponding apparatus, such as a relay node. An example of such a relay node is a layer 3 relay (self-backhauling relay) towards a base station or eNB. The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network, or a nearly exclusive downlink only device, such as a portable video player. Also equipment used for measuring certain values, such as sensors which can measure a temperature, a pressure etc., can be used as a corresponding user device. It should be appreciated that a device may be regarded as an apparatus or as an assembly of more than one apparatus, whether functionally in cooperation with each other or functionally independently of each other but in a same device housing.

embodiments suitable to be implemented as software code or portions of it and being run using a processor or processing function are software code independent and can be specified using any known or future developed programming language, such as a high-level programming language, such as objective-C, C, C++, C#, Java, etc., or a low-level programming language, such as a machine language, or an assembler.

implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described, an apparatus may be implemented by a semiconductor chip, a chipset, or a (hardware) module including such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, including a computer usable medium having a computer readable program code embodied therein, the computer readable program code adapted to execute a process as described in embodiments, wherein the computer usable medium may be a non-transitory medium.

Although the present invention has been described herein before with reference to particular embodiments thereof, the present invention is not limited thereto and various modifications can be made thereto.

The invention claimed is:

1. An apparatus including
at least one processing circuitry,
and
at least one memory for storing instructions to be executed by the processing circuitry, wherein
the at least one memory and the instructions are configured to, with the at least one processing circuitry, cause the apparatus at least:
to acquire service policy rules to be applied to a communication of a service data flow in a communication network, wherein the service policy rules are to be used for routing a service data flow to and within at least one external service function and/or at least one external service function chain;
to provide, to an external service function providing side, the acquired service policy rules as information related to an intended usage of at least one external service function and/or at least one external service function chain in a service data flow communicated in a communication network; and
to acquire, as the service policy rules, generic service policy rules by one of
creating the generic service policy rules,
referring to set configuration information including information related to the generic service policy rules, or
processing information obtained from a third entity,
wherein the generic service policy rules include at least one of an identification information for the service data flow, an identification information for at least one service function and/or at least one service function chain via which the service data flow is to be routed, and rules for a usage of the at least one service function and/or at least one service function chain via which the service data flow is to be routed.

2. The apparatus according to claim 1, wherein the generic service policy rules includes at least one of a static generic service policy rule part and a dynamically changeable generic service policy rule part, wherein the dynamically changeable generic service policy rule part is changeable with regard to an occurrence of a specific event.

3. The apparatus according to claim 1, wherein the at least one memory and the instructions are further configured to, with the at least one processing circuitry, cause the apparatus at least:
to acquire routing rules to be applied to the communication of a service data flow in the communication network, wherein the routing rules are to be used for identifying a service data flow to be routed to at least one external service function and/or at least one external service function chain; and
to provide, to a communication network control element, the acquired routing rules.

4. The apparatus according to claim 3, wherein the at least one memory and the instructions are further configured to, with the at least one processing circuitry, cause the apparatus at least:
to acquire the routing rules by one of
creating the routing rules,
referring to the set configuration information including information related to the routing rules, or
processing information obtained from the third entity.

5. The apparatus according to claim 1, wherein the at least one memory and the instructions are further configured to, with the at least one processing circuitry, cause the apparatus at least:
to update at least one of generic service policy rules, specific service policy rules and routing rules in response to an indication from at least one of the external service function providing side and the communication network.

6. The apparatus according to claim 1, wherein the at least one memory and the instructions are further configured to, with the at least one processing circuitry, cause the apparatus at least:
to acquire data indicating at least one available external service function and/or at least one available external service function chain via a predetermined interface,
to decide whether at least one of the indicated at least one external service function and/or at least one external service function chain is usable in a communication of a service data flow in the communication network, and
to select at least one from the indicated at least one external service function and/or at least one external service function chain for use on the basis of the decision whether at least one of the indicated at least one external service function and/or at least one external service function chain is usable in a communication of a service data flow,
wherein the information related to an intended usage of at least one external service function and/or at least one external service function chain in a service data flow communicated in a communication network is based on the selection.

7. The apparatus according to claim 6, wherein the at least one memory and the instructions are further configured to, with the at least one processing circuitry, cause the apparatus at least:
to consider whether at least one own service function of the communication network is usable instead of an indicated external service function or external service function chain, or whether the indicated at least one external service function or at least one external service function chain is applicable as a complement to at least one own service function of the communication network, wherein the decision whether at least one of the indicated at least one external service function or at least one external service function chain is usable in a communication of a service data flow is based on the consideration.

8. The apparatus according to claim 6, wherein the data indicating the at least one available external service function and/or at least one available external service function chain via the predetermined interface includes at least one of an indication of a respective external service function or external service function chain, an indication of capabilities of a respective external service function or external service function chain, and a tag or an identification element of a respective external service function or external service function chain.

9. The apparatus according to claim 1, wherein the apparatus is included in a communication network control element configured to act as at least one of a service selection control function and policy and charging rules function, which is connectable to an external service providing side by means of an application programming interface.

10. An apparatus including
at least one processing circuitry, and
at least one memory for storing instructions to be executed by the processing circuitry, wherein
the at least one memory and the instructions are configured to, with the at least one processing circuitry, cause the apparatus at least:
to acquire service policy rules to be applied to a communication of a service data flow in a communication network, wherein the service policy rules are to be used for routing a service data flow to and within at least one external service function and/or at least one external service function chain;
to provide, to an external service function providing side, the acquired service policy rules as information related to an intended usage of at least one external service function and/or at least one external service function chain in a service data flow communicated in a communication network;
to detect an event triggering activation of specific service policy rules being specific to a communication element or user of the communication network or a service data flow;
to acquire, as at least a part of the service policy rules, specific service policy rules being specific to the attached communication element or user or service data flow, whose activation is triggered, wherein the specific service policy rules are to be used for routing a service data flow to and within at least one external service function and/or at least one external service function chain; and
to provide, to an external service function providing side, the specific service policy rules.

11. The apparatus according to claim 10, wherein
the event triggering the activation of the specific service policy rules includes at least one of an attachment of a communication element or user to the communication network, an initiation of an application requiring a service data flow, an activation of a service, an update of a subscription of a communication element or user, a specified time point, an elapse of a specified period of time, a traffic load situation, a change of a location of the communication element or user, and the acquiring of the specific service policy rules includes at least one of generating the specific service policy rules and obtaining pre-stored information indicating the specific service policy rules.

12. The apparatus according to claim 10, wherein the at least one memory and the instructions are further configured to, with the at least one processing circuitry, cause the apparatus at least:
to create additional routing rules to be applied to the communication of the service data flow in the communication network, wherein the additional routing rules are to be used for identifying a relevant service data flow to be routed to at least one external service function or at least one external service function chain; and
to provide, to a communication network control element, the additional routing rules.

13. A method including
acquiring service policy rules to be applied to a communication of a service data flow in a communication network, wherein the service policy rules are to be used for routing a service data flow to and within at least one external service function and/or at least one external service function chain;
providing, to an external service function providing side, the acquired service policy rules as information related to an intended usage of at least one external service function and/or at least one external service function chain in a service data flow communicated in a communication network; and
acquiring, as the service policy rules, generic service policy rules by one of
creating the generic service policy rules,
referring to set configuration information including information related to the generic service policy rules, or
processing information obtained from a third entity,
wherein the generic service policy rules include at least one of an identification information for the service data flow, an identification information for at least one service function and/or at least one service function chain via which the service data flow is to be routed, and rules for a usage of the at least one service function and/or at least one service function chain via which the service data flow is to be routed.

14. The method according to claim 13, wherein the generic service policy rules includes at least one of a static generic service policy rule part and a dynamically changeable generic service policy rule part, wherein the dynamically changeable generic service policy rule part is changeable with regard to an occurrence of a specific event.

15. The method according to claim 13, further including
acquiring routing rules to be applied to the communication of a service data flow in the communication network, wherein the routing rules are to be used for identifying a service data flow to be routed to at least one external service function and/or at least one external service function chain; and
providing, to a communication network control element, the acquired routing rules.

16. The method according to claim 15, further including acquiring the routing rules by one of
creating the routing rules, referring to the set configuration information including information related to the routing rules, or processing information obtained from the third entity.

17. The method according to claim 13, further including detecting an event triggering activation of specific service policy rules being specific to a communication element or user of the communication network or a service data flow, and acquiring, as at least a part of the service policy rules, specific service policy rules being specific to the attached communication element or user or service data flow, whose activation is triggered, wherein the specific service policy rules are to be used for routing a service data flow to and within at least one external service function or at least one external service function chain, and providing, to an external service function providing side, the specific service policy rules.

18. The method according to claim 17, wherein the event triggering the activation of the specific service policy rules includes at least one of an attachment of a communication element or user to the communication network, an initiation of an application requiring a service data flow, an activation of a service, an update of a subscription of a communication element or user, a specified time point, an elapse of a specified period of time, a traffic load situation, a change of a location of the communication element or user, and the acquiring of the specific service policy rules includes at least one of generating the specific service policy rules and obtaining pre-stored information indicating the specific service policy rules.

19. The method according to claim 17, further including creating additional routing rules to be applied to the communication of the service data flow in the communication network, wherein the additional routing rules are to be used for identifying a relevant service data flow to be routed to at least one external service function or at least one external service function chain; and providing, to a communication network control element, the additional routing rules.

20. The method according to claim 13, further including updating at least one of generic service policy rules, specific service policy rules and routing rules in response to an indication from at least one of the external service function providing side and the communication network.

21. The method according to claim 13, further including acquiring data indicating at least one available external service function and/or at least one available external service function chain via a predetermined interface, deciding whether at least one of the indicated at least one external service function and/or at least one external service function chain is usable in a communication of a service data flow in the communication network, and selecting at least one from the indicated at least one external service function and/or at least one external service function chain for use on the basis of the decision whether at least one of the indicated at least one external service function and/or at least one external service function chain is usable in a communication of a service data flow, wherein the information related to an intended usage of at least one external service function or at least one external service function chain in a service data flow communicated in a communication network is based on the selection.

22. The method according to claim 21, further including considering whether at least one own service function of the communication network is usable instead of an indicated external service function or external service function chain, or whether the indicated at least one external service function or at least one external service function chain is applicable as a complement to at least one own service function of the communication network, wherein the decision whether at least one of the indicated at least one external service function or at least one external service function chain is usable in a communication of a service data flow is based on the consideration.

23. The method according to claim 21, wherein the data indicating the at least one available external service function and/or at least one available external service function chain via the predetermined interface includes at least one of an indication of a respective external service function or external service function chain, an indication of capabilities of a respective external service function or external service function chain, and a tag or an identification element of a respective external service function or external service function chain.

24. The method according to claim 13, wherein the method is implemented in a communication network control element configured to act as at least one of a service selection control function and policy and charging rules function, which is connectable to an external service providing side by means of an application programming interface.

25. A computer program product embodied on a non-transitory computer-readable medium, said product including software code portions for performing the steps of claim 13, when said product is run on the computer.

26. The computer program product according to claim 25, wherein the computer program product is directly loadable into the internal memory of the computer or transmittable via a network by at least one of upload, download and push procedures.

* * * * *